(12) United States Patent
Busold et al.

(10) Patent No.: US 7,021,422 B2
(45) Date of Patent: Apr. 4, 2006

(54) CLUTCH SYSTEM

(75) Inventors: Thomas Busold, Fulda (DE); Wolfgang Grosspietsch, Schweinfurt (DE); Olaf Moseler, Würzburg (DE)

(73) Assignee: ZF Sachs AG, Schweinfurt (DE)

( * ) Notice: Subject to any disclaimer, the term of this patent is extended or adjusted under 35 U.S.C. 154(b) by 27 days.

(21) Appl. No.: 10/432,181

(22) PCT Filed: Oct. 30, 2001

(86) PCT No.: PCT/EP01/12515

§ 371 (c)(1),
(2), (4) Date: Oct. 24, 2003

(87) PCT Pub. No.: WO02/40886

PCT Pub. Date: May 23, 2002

(65) Prior Publication Data

US 2004/0074732 A1    Apr. 22, 2004

(30) Foreign Application Priority Data

Nov. 17, 2000 (DE) ................................. 100 56 953
Jan. 23, 2001 (DE) ................................. 101 02 874

(51) Int. Cl.
*F16D 25/12* (2006.01)
*F16D 21/06* (2006.01)
*F16D 48/06* (2006.01)

(52) U.S. Cl. ............................. 182/87.13; 192/70.12; 192/113.34

(58) Field of Classification Search ............... 192/48.8, 192/48.9, 48.91, 87.11, 87.13, 87.14, 87.18, 192/70.12, 85 AA, 85 R, 87.1, 113.3, 113.4, 192/113.34; 184/29, 31

See application file for complete search history.

(56) References Cited

U.S. PATENT DOCUMENTS

| 4,271,723 | A | * | 6/1981 | Shaffer | ..................... 192/87.14 |
| 4,759,432 | A | | 7/1988 | Jürgens et al. | |
| 6,059,682 | A | * | 5/2000 | Friedmann et al. | ...... 192/87.15 |
| 6,145,644 | A | | 11/2000 | Mohan et al. | |
| 6,454,074 | B1 | * | 9/2002 | Kundermann et al. | ... 192/87.11 |
| 6,578,692 | B1 | * | 6/2003 | Porter | ..................... 192/87.13 |

FOREIGN PATENT DOCUMENTS

DE  26 04 608 A1  8/1977
DE  198 00 490 A1  8/1998

* cited by examiner

*Primary Examiner*—Rodney H. Bonck
(74) *Attorney, Agent, or Firm*—Cohen, Pontani, Lieberman & Pavane

(57) ABSTRACT

A clutch system includes a clutch arrangement between a drive unit and a transmission, a pump arrangement which supplies pressure medium to the clutch arrangement at a pressure and rate of flow, and an operating medium supply arrangement which supplies an operating medium to the clutch arrangement at a pressure which is less than the pressure of the pressure medium and a rate of flow which is greater than the rate of flow of the pressure medium. The operating medium supply arrangement includes a pressure receiving element which is movable in a housing and has at least one pressure receiving surface which is exposed to the pressure medium, and an interaction element which is coupled to move with the pressure receiving element and has at least one interaction surface which interacts with the operating medium to produce a flow of the operating medium.

72 Claims, 17 Drawing Sheets

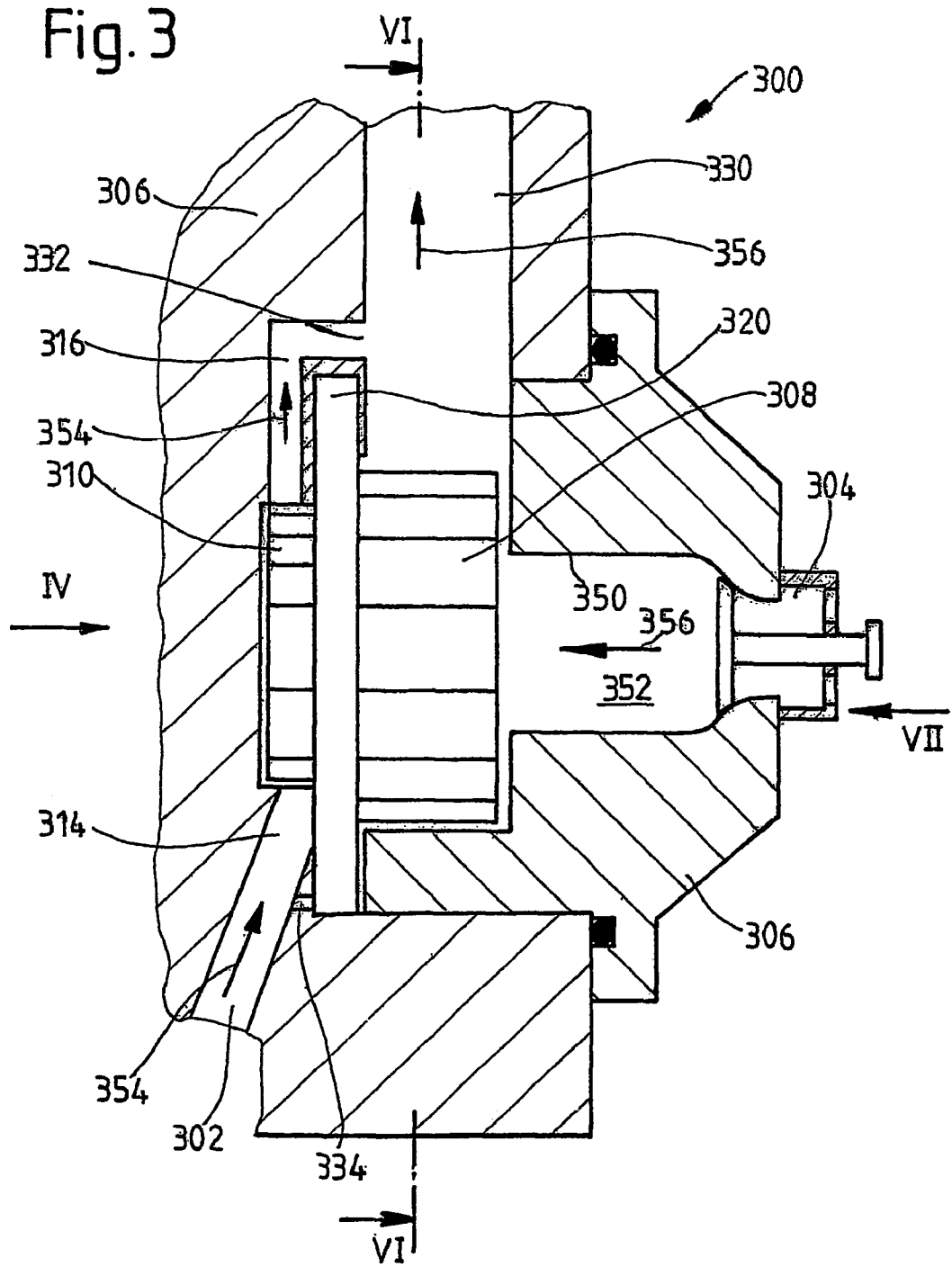

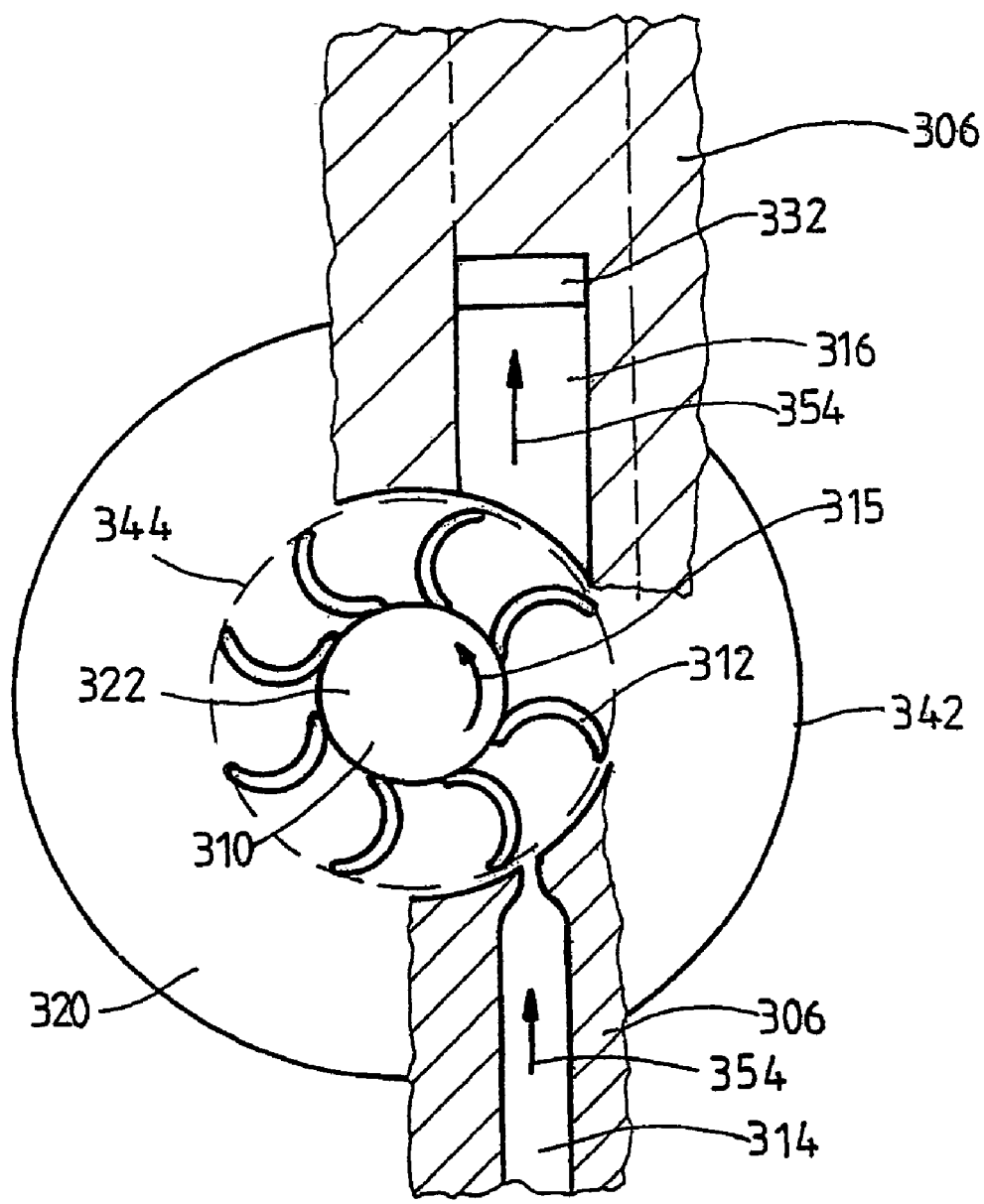

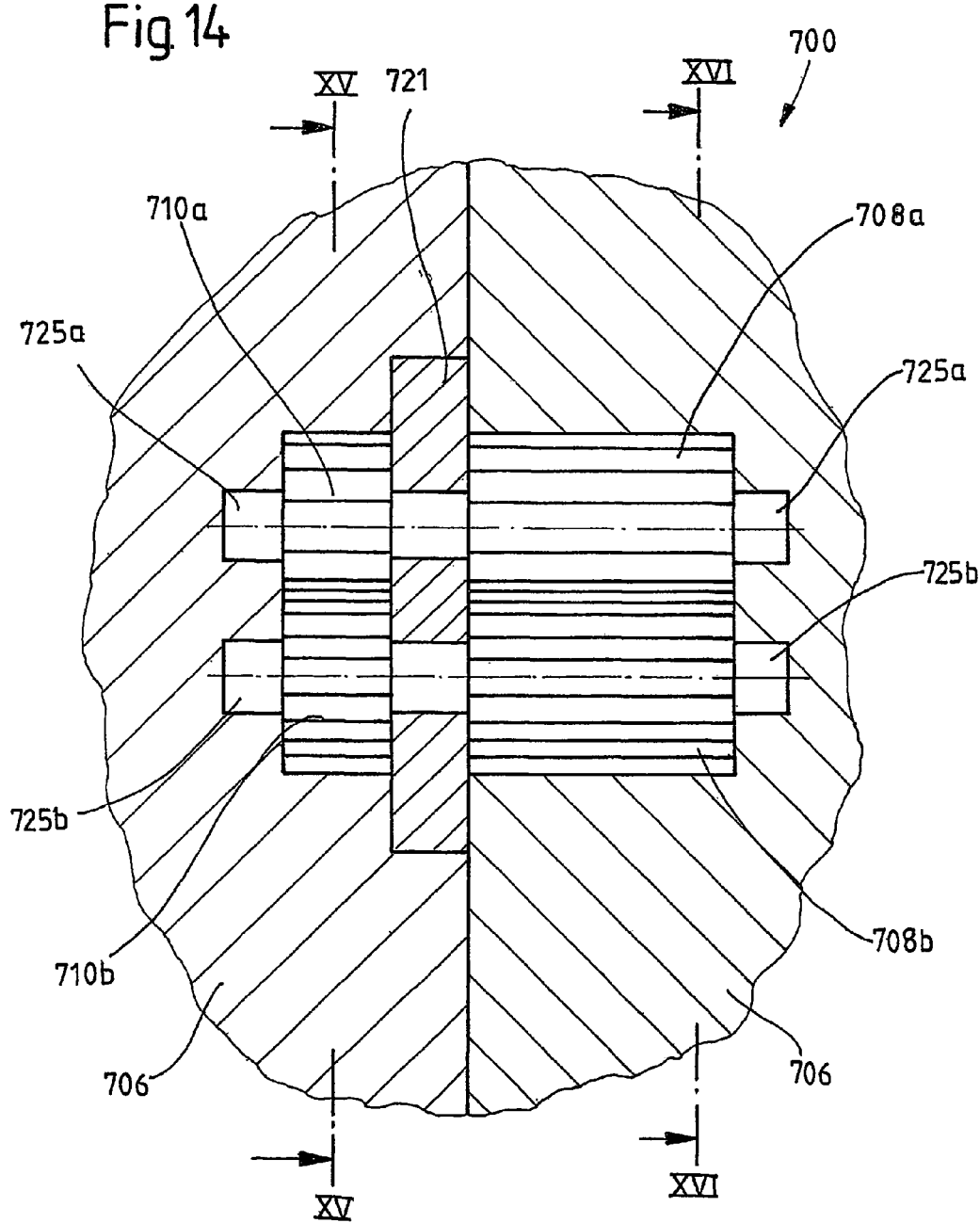

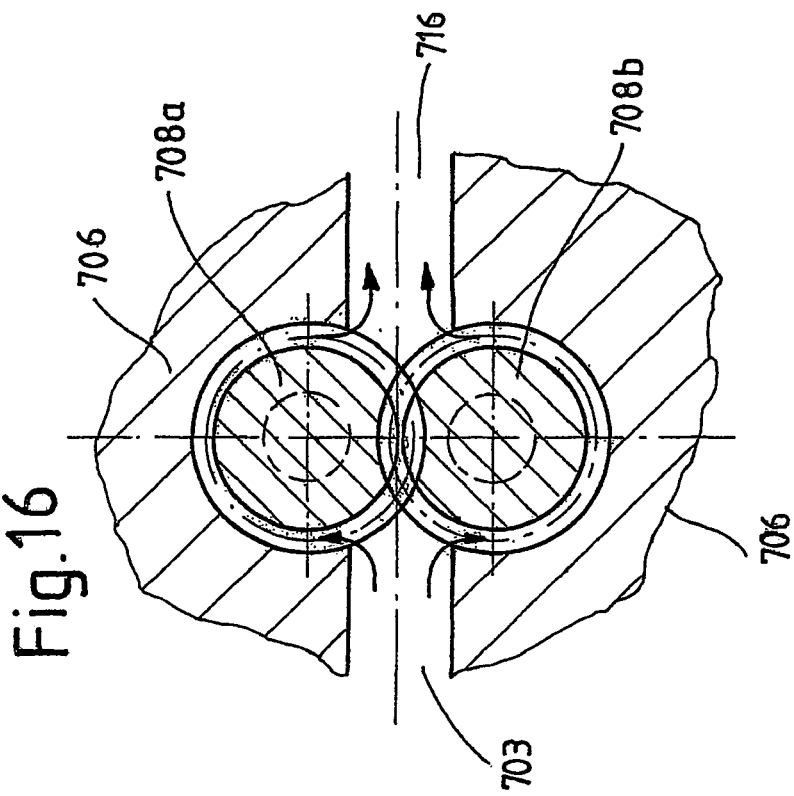
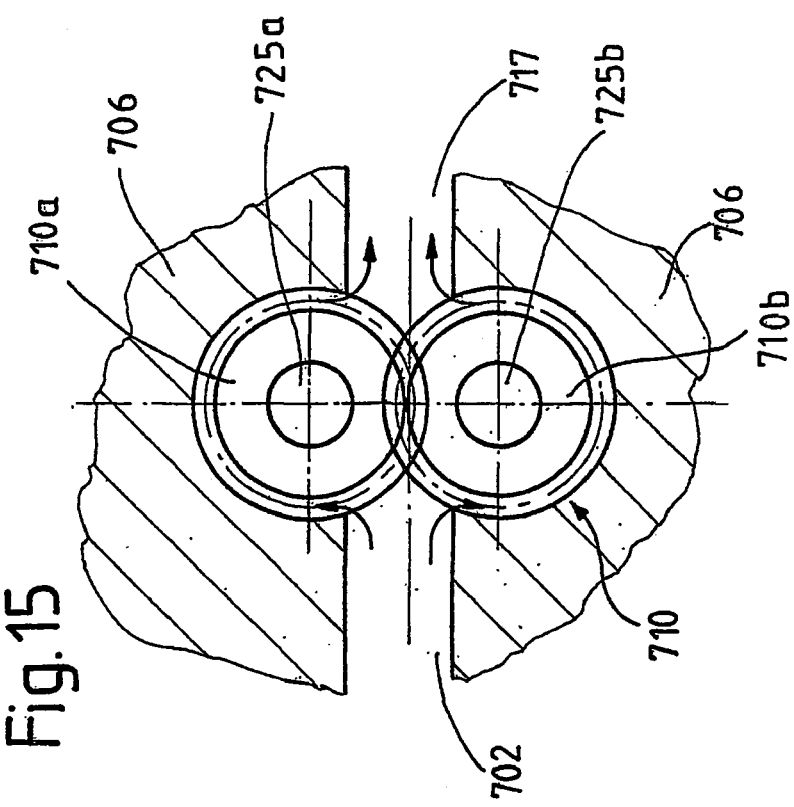

CLUTCH SYSTEM

BACKGROUND OF THE INVENTION

1. Priority Claim

This is the national phase application of PCT Application No. PCT/EP01/12515 filed on Oct. 30, 2001.

2. Field of the Invention

The invention relates to a clutch system including at least one clutch device, particularly for arrangement in a drivetrain (especially in a motor vehicle) between a drive unit and a transmission, wherein the clutch device has at least one clutch arrangement which is provided for operation under the effect of an operating medium and/or which can be actuated through a pressure medium.

3. Description of the Related Art

Reference is made herein in particular, but not exclusively, to a wet multi-disk clutch arrangement. Further, reference is made herein above all, but not exclusively, to a clutch arrangement which can be actuated by hydraulic means with a hydraulic slave cylinder integrated in the clutch device as is disclosed, for example, in U.S. Pat. No. 5,887,690 or in one of the present Assignee's patent publications concerning multiple clutch devices (particularly dual clutch devices). Reference is made particularly to U.S. Pat. Nos. 6,499,578, 6,523,657, and 6,586,852. The clutch arrangements of the referenced clutch devices are wet multi-disk clutch arrangements. U.S. Pat. No. 6,059,682 can be referred to with respect to wet, hydraulically actuated multi-disk clutch arrangements. A dry hydraulically actuated dual clutch device is known from U.S. Pat. No. 4,714,147.

In principle, there are many possible ways in which an operating medium, possibly a cooling liquid (especially cooling oil), is supplied to the clutch arrangement or to a plurality of clutch arrangements of the clutch device. It is the job of the designer to keep the costs and space requirement as low as possible while providing for a good efficiency and, accordingly, a low energy consumption for supplying the operating medium.

In some cases, other marginal conditions must be accounted for as well. For a clutch device with one or more wet, hydraulically actuated clutch arrangements (particularly multi-disk clutch arrangements), a flow of hydraulic medium must be supplied for controlling the clutch device or clutch devices in order to activate a clutch, i.e. engage a normally open type clutch or disengage a normally closed type clutch. A relatively small volume flow at relatively high pressure is needed for engaging and disengaging. Further, a large volume flow of coolant, particularly cooling liquid (generally oil), is required for wet operation or for cooling of the clutch devices, wherein a volume flow at a lower pressure level is sufficient or even necessary.

It is possible to provide two separate pumps which are driven by motor (e.g., determined by the drive unit and/or transmission) or by electric motor, one of which is designed to supply the pressure medium flow for controlling the clutch device or clutch devices and the other is designed for supplying the flow of operating medium. However, this solution is comparatively costly.

DE 198 00 490 A1 discloses another approach. A suction jet pump is provided in the supply area of a hydraulic fluid serving to cool a multi-disk clutch arrangement in order to achieve high throughflow rates and, therefore, a high cooling output. The suction jet pump receives a flow of hydraulic fluid from a hydraulic pump which provides a hydraulic pressure sufficient for actuating the multi-disk clutch arrangement. The suction jet pump sucks additional hydraulic fluid out of the oil pan.

While the hydraulic pump need not be designed for very high pumping outputs and a separate motor-driven pump for pumping coolant can be dispensed with using the approach disclosed in DE 198 00 490 A1, the approach based on the suction jet pump is disadvantageous because the efficiency of the suction jet pump is comparatively poor due to the high vortex losses of a suction jet pump and the energy consumption is consequently relatively high.

SUMMARY OF THE INVENTION

According to a first embodiment, a clutch system includes at least one clutch device, particularly for arrangement in a drivetrain between a drive unit and a transmission. The clutch device has at least one clutch arrangement which is provided for operation under the action of an operating medium. The operating medium can be supplied to the clutch arrangement by means of a pump arrangement supplying pressure medium and an operating medium supply arrangement. The operating medium supply arrangement is connected to the pump arrangement and provides the operating medium in a flow of the operating medium with reduced pressure relative to a pressure medium whose pressure is given by the pump arrangement and, in relation to the medium volume supplied per time unit averaged over time. The operating medium flow is greater than a pressure medium flow possibly flowing from the pump arrangement to the operating medium supply arrangement. Therein, the operating medium supply arrangement has at least one pressure receiving element and at least one interaction element. The pressure receiving element is arranged so as to be movable in a housing and which is exposed at least on at least one pressure receiving surface to the pressure medium that is provided by the pump arrangement in operation and that can be set in motion through the intermediary of the pressure medium. The interaction element is arranged so as to be movable in the housing or a housing and is coupled with respect to movement with the pressure receiving element and interacts during operation with the operating medium at least on at least one interaction surface. The operating medium flow can be supplied through the intermediary of this interaction element.

Due to the operating medium supply arrangement according of the present invention, the operating medium can be provided economically and in a reliably operating manner with high efficiency and in a comparatively large volume flow. The operating medium supply arrangement can advisably be connected to an operating medium reservoir and can draw the operating medium from the latter to supply the clutch arrangement.

The operating medium supply arrangement may be constructed as a pressure converter arrangement. In one embodiment, the operating medium supply arrangement is constructed in such a way that the effective area of the pressure receiving surface exposed to the pressure medium is smaller per time unit averaged over time than the effective area of the interaction surface interacting with the operating medium.

In one economical embodiment, at least one component is provided which is constructed integrally or in one piece and which forms the pressure receiving element or a pressure receiving element and the interaction element or an interaction element. For example, the component can advantageously be constructed as a piston arranged in a piston housing so as to be displaceable along an axis with a first piston surface exposed to the pressure medium and a second piston surface interacting with the operating medium. The first piston surface serves as a pressure receiving surface and the second piston surface serves as an interaction surface. The piston surfaces can be arranged at opposite axial end faces of the piston. The first piston surface is preferably smaller than the second piston surface.

Another embodiment which is particularly advantageous with respect to the attainable volume flow is characterized in that at least one rotor component forms the pressure receiving element and/or the interaction element.

The particular construction of the operating medium supply arrangement notwithstanding, this can comprise a pump arrangement or can be identifiable as a pump arrangement.

In general, the clutch device can be actuated through the intermediary of the pressure medium supplied by the pump arrangement.

According to a second aspect, the present invention provides, a clutch system includes at least one clutch device particularly for arrangement in a drivetrain, particularly in a motor vehicle between a drive unit and a transmission. The clutch device has at least one clutch arrangement which can be actuated through the intermediary of pressure medium, wherein the pressure medium can be supplied for the actuation based on a pump arrangement supplying an operating medium and based on a pressure medium supply arrangement which is connected to the pump arrangement and which supplies the pressure medium at a pressure that is increased relative to a pressure of the operating medium that is given by the pump arrangement, and possibly in a flow of pressure medium which, with respect to medium volume supplied per time unit averaged over time, is smaller than an operating medium flow possibly flowing from the pump arrangement to the pressure medium supply arrangement, wherein the pressure medium supply arrangement has at least one pressure receiving element which is arranged so as to be movable in a housing and which is exposed in operation at least on at least one pressure receiving surface to the operating medium supplied by the pump arrangement and can be set in motion through the intermediary of the operating medium, and at least one interaction element which is arranged so as to be movable in the housing/a housing and which is coupled with respect to movement with the pressure receiving element and interacts during operation with the pressure medium at least on at least one interaction surface, and the pressure medium can be supplied through the intermediary of the interaction element.

Due to the pressure medium supply arrangement according to the present invention, the operating medium can be provided economically and in a reliably operating manner with high efficiency and with a pressure level that is sufficient for clutch actuation. In this connection, the pressure medium supply arrangement can advisably be connected to a medium reservoir and can draw medium from the latter to supply the clutch arrangement and/or can conduct medium away to the medium reservoir. The pressure medium supply arrangement can also be constructed in such a way that it supplies the operating medium drawn from the pump arrangement as pressure medium.

The pressure medium supply arrangement can advisably be constructed as a pressure converter arrangement. According to an advantageous construction, the pressure medium supply arrangement is constructed in such a way that the effective area of the pressure receiving surface exposed to the operating medium is larger per time unit averaged over time than the effective area of the interaction surface interacting with the pressure medium.

In one economical embodiment, at least one component is provided which is constructed integrally or in one piece and which forms the pressure receiving element and the interaction element. For example, the component can advantageously be constructed as a piston arranged in a piston housing so as to be displaceable along an axis with a first piston surface which serves as a pressure receiving element and which is exposed to the operating medium and a second piston surface interacting with the pressure medium which serves as interaction surface. The piston surfaces can be arranged at opposite axial end areas of the piston. The first piston surface is preferably larger than the second piston surface.

In another advantageous embodiment, at least one rotor component forms the pressure receiving element and/or the interaction element.

Irrespective of the specific construction of the pressure medium supply arrangement, this can comprise a pump arrangement or can be identified as a pump arrangement.

Above all, the clutch device is intended for operation under the influence of an operating medium which can be supplied to the clutch device by the pump arrangement for this operation.

With respect to the clutch system according to the first aspect and with respect to the clutch system according to the second aspect, it is provided that a hydraulic medium is used as operating medium and as pressure medium.

According to a third aspect of the present invention, a clutch system comprises at least one clutch device particularly for arrangement in a drivetrain (particularly in a motor vehicle) between a drive unit and a transmission, wherein the clutch device has at least one clutch arrangement which is provided for operation under the influence of an operating medium and to which the operating medium can be supplied for this operation based on a first pump arrangement (also referred to hereinafter as primary pump arrangement) which supplies the pressure medium and a second pump arrangement (also referred to hereinafter as secondary pump arrangement) which is connected to the first pump arrangement and which can be driven by the pressure medium supplied by the first pump arrangement, wherein the secondary pump arrangement has at least one pump element which is arranged so as to be movable in a housing, can be driven through the intermediary of the pressure medium (also referred to hereinafter as primary medium), interacts with the operating medium (also referred to hereinafter as secondary medium), and conveys the secondary medium (operating medium) during operation by means of displacement and/or by imparting an acceleration and/or by imparting torsion or angular momentum in the direction of the clutch arrangement. The secondary pump arrangement which is provided according to the present invention can be identified as an operating medium supply arrangement according to the first aspect of the present invention.

Further, according to a fourth aspect, the present invention provides a clutch system comprising at least one clutch device particularly for arrangement in a drivetrain (particularly in a motor vehicle) between a drive unit and a transmission, wherein the clutch device has at least one clutch arrangement which can be actuated through the intermediary of pressure medium, wherein the pressure medium can be supplied for this actuation based on a second pump arrangement (also referred to hereinafter as primary pump arrangement) supplying operating medium and a first pump arrangement (also referred to hereinafter as secondary pump arrangement) which is connected to the second pump arrangement and can be driven by the operating medium supplied by the second pump arrangement, wherein the secondary pump arrangement has at least one pump element which is arranged so as to be movable in a housing, can be driven through the intermediary of the operating medium (also referred to hereinafter as primary medium), interacts with the pressure medium (also referred to hereinafter as secondary medium) and, during operation, brings the secondary medium (pressure medium) to a pressure sufficient for clutch actuation by means of displacement and/or imparting an acceleration and/or imparting a torsion or angular momentum. The secondary pump arrangement which is provided according to the invention can be identified as a pressure medium supply arrangement according to the second aspect of the present invention.

As a rule, in any case when the operating medium is a liquid, the second pump arrangement is connected to an operating medium reservoir and can draw operating medium from the latter for supplying to the clutch arrangement. The second pump arrangement can supply the operating medium in a operating medium flow which has a lower pressure than a pressure of the pressure medium that is given by the first pump arrangement and which, with respect to the medium volume supplied per time unit averaged over time, is greater than pressure medium flow possibly flowing from the first pump arrangement to the second pump arrangement or which can be supplied in its entirety in continuous operation by the pump arrangement.

With respect to the drive of the primary pump arrangement, it is intended above all that this primary pump arrangement can be driven electrically and/or through the intermediary of the drive unit and/or the transmission.

At least one of the first and second pump arrangements can comprise at least one hydrostatic pump or a pump constructed as a positive-displacement machine. Above all, it is intended that the first pump arrangement has at least one hydrostatic pump or pump constructed as a positive-displacement pump. Pumps of this kind are particularly suitable for building up high pressures and therefore—to mention one example—can advantageously supply the pressure that may be required for actuating the clutch arrangement. Examples for suitable pumps of the above-mentioned type, depending on requirements, are piston pumps, particularly axial piston pumps and radial piston pumps, toothed gear pumps and toothed ring pumps, vane cell pumps, screw pumps and rotary plunger pumps. Further or alternatively, at least one of the first and second pump arrangements can comprise at least one hydrodynamic pump or a pump constructed as a liquid flow machine. It is intended particularly that the second pump arrangement has at least one hydrodynamic pump, or pump constructed as a flow machine, that can be driven by pressure medium supplied by the first pump arrangement. Pumps of this kind are particularly suited to supply large volume flows, so that, if necessary, a large volume flow of operating medium can easily be supplied for feeding to the at least one clutch arrangement. Examples of pumps of this type are torque or swirl pumps and centrifugal pumps or impeller pumps.

For the application mentioned above with at least one hydraulically actuated wet multi-disk clutch arrangement, because of the comparatively high pressure at a comparatively small volume flow that is required for clutch actuation on the one hand and by reason of the comparatively high volume flow at a comparatively low pressure required for wet operation on the other hand, it seems advantageous when the first pump arrangement comprises at least one hydrostatic pump or pump constructed as a positive-displacement machine and when the second pump arrangement comprises at least one hydrodynamic pump or pump constructed as a flow machine. However, this design of the clutch system which is viewed as especially advantageous is in no way compulsory.

The pump (of the first or second pump arrangement) can have at least one pump element that can be driven in a translational or rotational manner and which can be driven by a motor, particularly an electric motor, in the case of a pump associated with the primary pump arrangement or which can be driven through the intermediary of the primary medium in case of a pump associated with the secondary pump arrangement. For example, the secondary pump arrangement can have at least one piston pump that can be driven by the primary medium supplied by the primary pump arrangement. The piston pump can have at least one piston which is arranged in a pump housing so as to be displaceable along an axis and with a first piston surface exposed to the primary medium and a second piston surface interacting with the secondary medium. The piston surfaces can be arranged at opposite axial end areas of the piston. In order to make use of or achieve the possibly high pressure level of the pressure medium on the one hand and/or to achieve or make use of a high operating medium delivery volume on the other hand, it can be advantageous when the piston surface associated with the pressure medium is smaller than the piston surface associated with the operating medium.

When only one piston is provided, the pump delivers the secondary medium in pulses because of an oscillating piston operation, so that the pump can also be referred to as an impulse pump. In order to provide an at least approximately continuous secondary medium flow and/or to prevent mechanical vibrations deriving from the oscillating movement of the piston, the secondary pump arrangement can have a plurality of piston pumps which can be operated synchronously with offset piston stroke phases. For example, a first piston pump and a second piston pump can be operated synchronously with piston stroke phases that are offset by approximately 180°. As a result of this kind of oppositely running operation of the two piston pumps, mechanical vibrations are sufficiently compensated or prevented.

The expenditure on control of the secondary pump arrangement is particularly low when an intake or suction stroke and a discharge stroke of the piston pump can be triggered alternately by means of a valve arrangement which is connected between the primary pump arrangement and the piston pump of the secondary pump arrangement. Either the suction stroke or the discharge stroke or both can be triggered by applying primary medium pressure to a control input of the piston pump associated with the respective stroke. The piston pump can have a return spring arrangement which is put under increasing tension during a suction stroke and discharge stroke.

It is suggested that at least one pressure reduction valve is provided, by means of which a primary medium pressure applied to a control input of the piston pump can be reduced by allowing the primary medium to flow off in order to trigger the suction stroke or discharge stroke of the piston pump.

The other respective stroke, the suction stroke or discharge stroke, can then be carried out by means of the return spring acting on the piston. When the valve arrangement is arranged between the primary pump arrangement and the piston pump it can form the pressure reduction valve or has this pressure reduction valve. However, the pressure reduction valve can also be a valve that is separate from said valve arrangement.

It is particularly preferable that the pressure reduction valve is integrated in the secondary pump arrangement. This avoids the flow resistance of longer lines so that the primary medium pressure can be reduced especially quickly, and a particularly high pump output can be achieved for the piston pump. The pressure reduction valve can be mechanically actuated through the intermediary of a stroke movement of a/the piston of the piston pump and/or through the intermediary of primary medium acting on the pressure reduction valve. In this connection, it is suggested by way of a further development that a plurality of valve elements of the pressure reduction valve are displaceable between a first relative position identified as opening position and a second relative position identified as the closing position in response to the stroke movement of the piston and/or in response to primary medium acting on at least one of the valve elements. For example, a first valve element and a second valve element can be provided which are pretensioned in the direction of the open position by a pretensioning spring arrangement. The piston can advantageously form a valve element.

In a particularly preferred manner, the pressure reduction valve can be moved into an/the open position in that a valve element executing the stroke movement along with the piston contacts a stop and/or in that the pressure reduction valve is actuated by the piston contacting an actuating stop and can be brought into a/the closing position by primary medium acting on at least one valve element. In this way, a compulsory control of the pressure reduction valve can be achieved to a certain extent, so that it need not be controlled separately.

In general, it is advantageous for a highly efficient secondary pump arrangement when the latter is constructed with at least one valve, particularly a non-return valve, which prevents secondary medium from the secondary pump arrangement (possibly from the piston pump) from flowing back into the secondary medium reservoir and/or with at least one valve, particularly a non-return valve, which prevents secondary medium from the side of the clutch arrangement from flowing back into the secondary pump arrangement (possibly into the piston pump).

According to an advantageous constructional variant, the secondary pump arrangement has at least one swirl pump or centrifugal pump (impeller pump) which can be driven by the primary medium supplied by the primary pump arrangement or at least one rotary positive-displacement pump, possibly a toothed gear pump or toothed ring pump, which can be driven by the primary medium supplied by the primary pump arrangement. As was already mentioned above, swirl pumps or centrifugal pumps can advantageously supply large volume flows, while positive-displacement pumps are particularly well suited for supplying higher pressures. The swirl pump or centrifugal pump or positive-displacement pump can have at least one rotor which interacts with the secondary medium. The rotor can be constructed as at least one blade or at least one rotor having another flow geometry or conveying geometry.

For purposes of driving the rotor, it is suggested that the latter can be driven by means of a hydromotor receiving primary medium from the primary pump arrangement. The hydromotor can be constructed as a flow machine (possibly a turbine) or positive-displacement machine. For example, a toothed gear motor or toothed ring motor, piston motor (particularly radial piston motor or axial piston motor) and a vane cell motor can be used. Generally speaking, the hydromotor can be constructed as a hydrostatic or hydrodynamic motor.

The hydromotor can be constructed as a rotary positive-displacement motor, for example, possibly as a toothed gear motor or toothed ring motor.

With regard to the prefix "hydro" (see hydromotor, hydrostatic pump, and hydrodynamic pump mentioned above) employed herein, this prefix does not exclude the possibility of a gaseous pressure medium and/or operating medium. Thus, in general, "pressure medium" designates a fluid under pressure and "operating medium" designates an operating fluid. Accordingly, the prefix "hydro" may also denote fluids. Therefore, instead of a "hydromotor" and a "hydrodynamic pump", it would also be possible to speak of a "fluid motor" and a "fluid-dynamic pump". Generally, however, the pressure medium and operating medium are liquid and can then also be designated as "pressure liquid" and "operating liquid."

The rotor interacting with the secondary medium and/or the rotor of the hydromotor can comprise a disk and/or a shaft with a flow geometry arrangement, possibly a blade arrangement. Diverse designs of the swirl pump or centrifugal pump are possible. For example, the swirl pump or centrifugal pump can be constructed in such a way that the pumped secondary medium flows against the rotor in a substantially axial or radial-tangential direction and flows off the rotor in a substantially axial or radial-tangential direction. This applies in a corresponding manner to the hydromotor. The latter can be constructed in such a way that the primary medium flows against the rotor in a substantially axial or radial-tangential direction and flows off the rotor in a substantially axial or radial-tangential direction.

It is advantageous for the actual pump as well as for the hydromotor when a plurality of flow-in channels or flow-off channels which are arranged in a substantially rotational-symmetric manner with respect to the rotor are provided in a housing accommodating the rotor for essentially radial-tangential flow against the rotor in question and/or for essentially radial-tangential flow away from the respective rotor. Bearings associated with the rotor then need only absorb comparatively small radial forces and a comparatively low-friction running of the rotor is ensured.

An advantageous construction is characterized in that at least one rotor interacting with the primary medium and at least one rotor interacting with the secondary medium have rotational axes which are essentially coaxial with respect to one another. In this respect, it is suggested by way of further development that at least one operating medium flow is guided substantially in axial direction at least in some areas as an annular flow surrounding at least a pressure medium flow and/or surrounding the rotor interacting with the pressure medium flow. The pressure medium flow and the operating medium flow can pass into a common medium flow which is fed to the clutch device as an operating medium flow, for example. The combination of a pressure medium flow and the operating medium flow and the supply of the combined medium flow to the clutch device, particularly to the clutch arrangement, can also be provided in the other designs described above, and indeed for all of the aspects of the present invention discussed. In this way, it can be achieved, for example, that a certain minimum supply of operating medium (operating liquid, particularly cooling oil) to the clutch device is ensured in case of a viscous operating medium at lower temperatures.

An advantageous embodiment form is characterized in that the secondary pump arrangement has at least two rotors which interact with the secondary medium and which are not arranged coaxial to one another and/or in that the hydromotor has at least two rotors which interact with the primary medium and which are not arranged coaxial to one another. This type of construction is particularly advisable for a secondary pump arrangement operating according to the principle of positive displacement or a hydromotor operating according to the principle of positive displacement.

With respect to the hydromotor, it is suggested by way of a further development that a drive formation, possibly a toothing, of a first rotor of the hydromotor meshes with a driving formation, possibly a toothing, of a second rotor of the hydromotor. With respect to the secondary pump arrangement, it is suggested by way of a further development that a conveying formation, possibly a toothing, of a first rotor of the secondary pump arrangement meshes with a conveying formation, possibly a toothing, of a second rotor of the secondary pump arrangement.

It will often be advisable that at least one rotor of the hydromotor interacting with the primary medium and at least one rotor of the secondary pump arrangement interacting with the secondary medium are coupled with one another by means of at least one common shaft which is shared by at least one rotor of the hydromotor and at least one rotor of the secondary pump arrangement. However, this is in no way mandatory. It can also be provided that a rotor of the hydromotor and a rotor of the secondary pump arrangement are arranged on a common shaft, while another rotor of the hydromotor and another rotor of the secondary pump arrangement are arranged on their own respective shafts which need not necessarily be rotationally coupled with one another as long as there is a coupling by means of the first rotor.

The clutch device (and the clutch arrangement) can be self-priming with respect to the operating medium. In this case, it is advantageous when the second pump arrangement allows operating medium which is sucked in by the clutch device (or clutch arrangement) to pass to the latter in a non-operational state. This makes possible an emergency operation, for example, when the second pump arrangement is defective. Also, it could be conceivable under certain circumstances to put the second pump arrangement out of operation, that is, to put it into the non-operational state, for certain operating states of the clutch system or drivetrain in order to save energy.

It has already been mentioned several times that the clutch arrangement can be actuated through the intermediary of pressure medium. It has already been made clear that it is intended in particular that the clutch arrangement can be actuated by means of pressure medium supplied by the pump arrangement according to the first aspect of the invention or by the first pump arrangement according to the third aspect of the present invention. For this purpose, the pump arrangement or the first pump arrangement is designed to supply pressure medium at a pressure sufficient for actuating the clutch arrangement.

It is noted for the sake of clarity that the clutch device according to the second and fourth aspects of the invention can also be a clutch device which is provided for an operation under the influence of the operating medium supplied by the pump arrangement or by the second pump arrangement.

It has already been made clear that the clutch arrangement is intended above all to be a wet clutch arrangement, that the operation is a wet operation under the influence of the operating medium, and that the operating medium is an operating liquid, possibly a cooling liquid. Of the possible wet clutch arrangements, a multi-disk clutch arrangement is intended above all.

The pressure medium can be a hydraulic pressure medium, particularly a hydraulic oil which may also serve as a cooling liquid.

The clutch device can be a multiple clutch device with a plurality of clutch arrangements, for example, a dual clutch device with two clutch arrangements assigned to a transmission input shaft. In this connection, reference is had particularly to the embodiments disclosed in the present Applicant's patent applications cited above.

It can be advisable to construct the clutch system in such a way that operating medium can be supplied to the clutch arrangement through the intermediary of an operating medium storage which is connected or can be connected to the operating medium supply arrangement or to the pump arrangement or to the second pump arrangement. Further, an advantageous construction can consist in that the clutch arrangement can be actuated through the intermediary of a pressure medium storage which is connected or can be connected to the pump arrangement or to the pressure medium supply arrangement or to the first pump arrangement.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings:

FIG. 3 is a partial cross-sectional view of a rotor device which can be used as a pressure converter or pump and can be used as a component P of the arrangement according to FIG. 1;

FIG. 4 is a partial cross-sectional view of a rotor of the rotor device which is driven by pressure fluid, including a pressure fluid supply channel and a pressure fluid discharge channel in accordance with one embodiment of the present invention;

FIG. 14 is a partial cross-sectional view of one embodiment of a rotor device which can be used as a pressure converter or pump and which can be used as component P of the arrangement of FIG. 1 or as component P of the arrangement of FIG. 9;

FIG. 15 is a partial cross-sectional view of the rotor device along section XV—XV of FIG. 14;

FIG. 16 is a partial cross-sectional view along-section XVI—XVI of FIG. 14;

DETAILED DESCRIPTION OF THE PRESENTLY PREFERRED EMBODIMENTS

Figure 1:
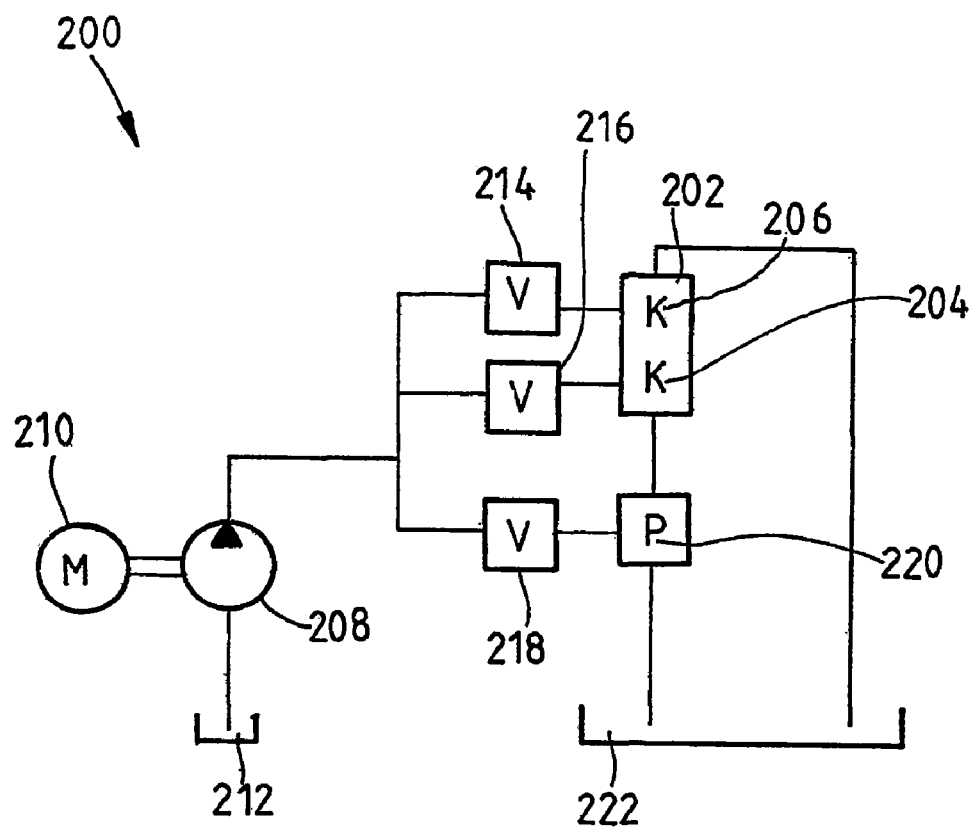
FIG. 1 is a schematic view of an embodiment of a clutch system having a wet dual clutch.

FIG. 1 is a schematic view showing a clutch system 200 which has a wet dual clutch 202 with a first, radially inner clutch device 204 and a second, radially outer clutch device 206. The clutch devices 204 and 206 are wet clutch devices, for example, wet multi-disk clutch devices which have, as is known in the art, at least one disk stack, are arranged one upon the other radially in the present embodiment example, and are actuated in each instance by an associated actuating piston of a hydraulic slave cylinder integrated in the dual clutch. Examples of dual clutches of this type are disclosed in the patents cited hereinabove.

A basic problem in clutches of this kind is that a high pressure is generally required at a small volume flow for actuating the clutch devices 204, 206, especially the disk stacks. In contrast, a low pressure at a high volume flow is required for wet operation of the clutch devices 204, 206, particularly for cooling the disk stacks. In order to be able to meet both of these conflicting requirements, two different, mutually independent pumps can be provided. However, due to the high space requirement this creates problems with respect to design and also economically because of the comparatively high cost, depending on the type and drive of the pumps.

In contrast, a pump 208 is provided in the arrangement according to FIG. 1 which is driven by an electric motor 210 and sucks hydraulic medium (particularly hydraulic oil) from a hydraulic reservoir 212. This hydraulic medium is conveyed further to valves 214, 216 and 218.

The pump 208 generates a sufficiently high pressure to dependably actuate the clutch devices 204, 206, so that the associated clutch device is actuated, i.e.—engaged in case of a "normally open" clutch according to the valve state of the valve in question or disengaged in case of a "normally closed" clutch according to the valve state of the respective valve—as soon as one of the valves 214 and 216 is switched to open.

The valve 218, together with component P which is designated by reference number 220, serves to convert the pressure at the input side of valve 218 at a small volume flow into a low pressure with a large volume flow. Accordingly, the subassembly formed by the valve 218 and component P 220 has pressure-converting characteristics. In order to supply a larger volume flow of operating medium, in this case cooling oil, component P 220 is connected to an oil reservoir 222. It is not compulsory that the reservoir 222 is a separate reservoir from reservoir 212. The component P 220 provides at least one operating medium flow, in this case a flow of cooling oil, which is conducted to the clutch devices 204, 206, particularly to their disk stacks in case of the present example.

Therefore, component P 220 or the subassembly formed by component P 220 and valve 218 is considered as a pump arrangement. Embodiments of devices that can be used as component P 220 are presented below. To the extent that these devices are designated as "pump" or "pump arrangement" herein, this in no way confines or limits the subject matter of the invention. However, as is easily recognized, component P 220 may be at least one pump or one pump arrangement corresponding to one embodiment of the invention. A further embodiment of the invention is directed to the pressure conversion of the comparatively high clutch actuation pressure supplied by the pump 208 into a lower pressure with a greater volume flow for the clutch cooling, which pressure conversion is achieved according to the embodiment of FIG. 1.

Figure 2:
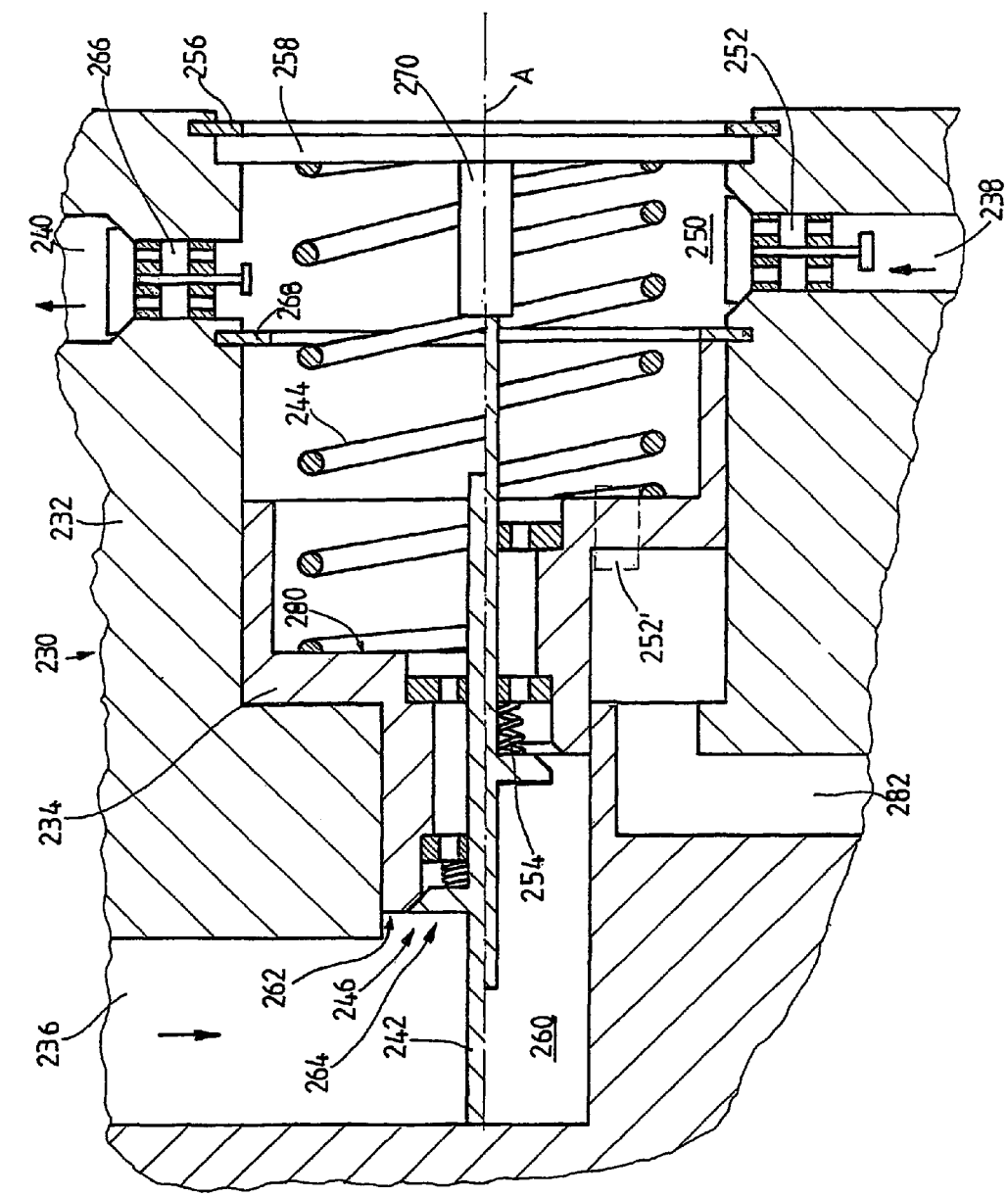
FIGS. 2a and 2b are partial cross-sectional views of a piston device which is usable as a pressure converter or pump and can be used as a component P of the arrangement according to FIG. 1.
Figure 2A:
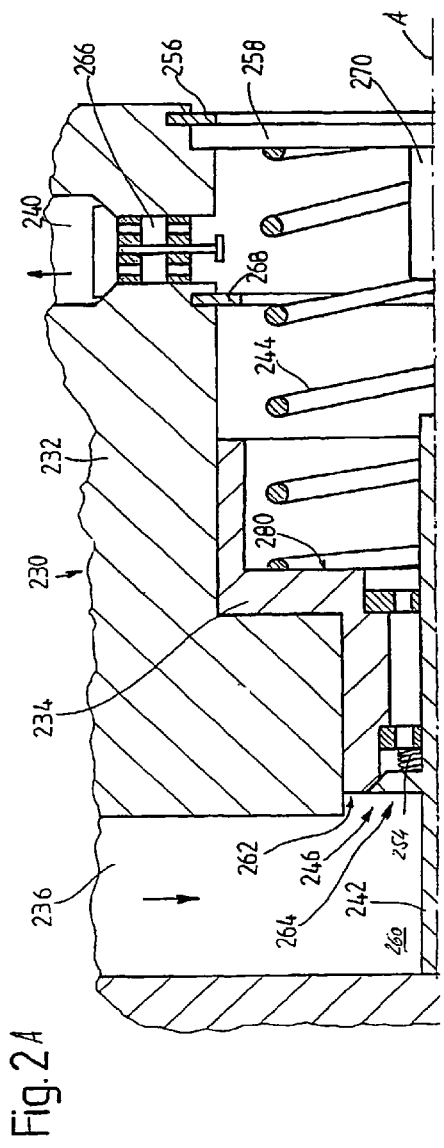
Figure 2B:
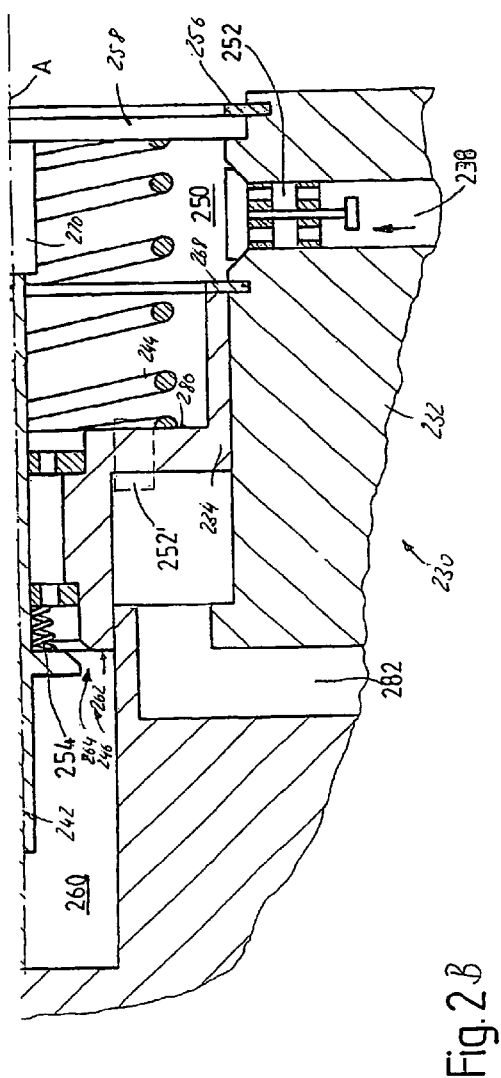

FIGS. 2*a* and 2*b* show a piston device 230 which can be used as component P 220 and which has a piston 234 which is mounted in a housing 232 so as to be displaceable along an axis A. The piston device 230 has a connection 236 at which the piston device 230 serving as component P 220 is connected to the valve 218. The piston device 230 is connected to the reservoir 222 via another connection 238. The dual clutch 202 is supplied with the cooling oil via a third connection 240.

FIGS. 2*a* and 2*b* show the piston 234 and a valve element 242 cooperating with the latter in two different positions, one of which is shown which is FIG. 2*a* which is in the half-plane above the axis A and the other is FIG. 2*b* which is shown in the half-plane below the axis A. In FIG. 2*a*, the position of the piston and of the valve element is occupied by the piston 234 and the valve element 242 at the end of a stroke of the piston 234 which is carried out under the action of a return spring 244 and which can be identified as the "suction stroke" and of a stroke of the valve element 242 which moves along with the piston 234. A pressure reduction valve 246 which is formed by the piston 234 and the valve element 242 is closed and an interior space 250 of the piston device is filled with cooling oil that is sucked in via the connection 238 and a non-return valve 252. The piston 234 and the valve element 242 are pretensioned or biased with respect to one another in the opening direction of the pressure reduction valve 246 by a valve spring 254. However, the piston 234 and the valve element 242 occupy the closed position since the valve element 242 is pushed by a valve shaft at a housing portion and the spring force of the return spring 244 is sufficient to displace the piston 234 against the action of the spring 254 into a stop position in which the piston 234 stops at the housing by a piston portion extending in radial direction and closes the pressure reduction valve 246 in cooperation with the valve element 242. This is illustrated in FIG. 2b. The return spring 244 which preferably acts directly at the above-mentioned piston portion is supported at a closure plate 258 which closes the interior space 250 and which is held at the housing 232 by a snap ring 256.

The piston position and valve position shown in FIG. 2a are occupied when a comparatively low pressure prevails in interior space 260 of the piston device 230, so that the return spring 244 can move the piston 234 and the valve element 242 into the stop position shown in FIG. 2b. The valve 218 is then closed. When pressure oil supplied via connection 236 by the pump 208 is conducted into the interior space 260 at comparatively high pressure by switching the valve 218 which, in the simplest case, is constructed as a lift valve, this pressure oil acts on a first piston surface 262 of the piston and an associated pressure receiving surface 264 of the valve element 242. Since forces exerted by the pressure oil in the interior space 260 on the pressure receiving surface 264 are conducted away via the valve spring 254 and a contact of the piston 234 and valve element 242 against one another in a positive-locking connection closing the pressure reduction valve 246, the actual piston surface or pressure receiving surface 262 of the piston on the one hand and the pressure receiving surface 264 of the valve element 242 on the other hand can be taken into account jointly in the form of an individual effective piston surface associated with the pressure oil.

The pressure oil in the interior space 260 displaces the piston 234 and the valve element 242 together in the direction of the closure plate 258 against the action of the return spring 244. In so doing, cooling oil is displaced from the interior space 250 via a check valve 266 and the connection 240 in the direction of the dual clutch 202. Accordingly, the piston 234 executes a "discharge stroke." This discharge stroke ends when the piston 234 strikes against a stop ring 268 which is held inside the interior space 250 at the housing 232 in the manner of a snap ring.

Shortly before the piston 234 stops against the stop ring 268, the valve shaft of the valve element 242 strikes a stop pin 270 which is arranged at the closure plate 258, so that the valve element 242 can not take part in the rest of the discharge stroke along with the piston 234.

The pressure of the pressure oil in the interior space 260 is sufficient for the pressure oil acting on the first piston surface 262 to move the piston 234 into its stop position while releasing the valve element 242 until the piston 234 stops against the stop ring 268. The pressure reduction valve 246 which was previously held in its closed position by the pressure oil in the interior space 260 against the action of the valve spring 254 accordingly opens so that pressure oil can flow out of the interior space 260 through a passage formed between the piston 234 and the web of the valve element 242 into the interior space 250. This situation is shown in FIG. 2b; a passage can be seen between an annular flange having the pressure receiving surface 264 and an associated end portion of the piston 234.

The piston position and valve position shown in FIG. 2a or a somewhat different position corresponding to a pressure and force equilibrium to be adjusted is occupied until pressure oil is subsequently delivered into the interior space 260 via the valve 218 and the connection 236. When the valve 218 is closed, the returning movement of the piston 234 corresponding to the "suction stroke" and the returning movement of the valve element 242 into the position shown in FIG. 2a is initiated under the influence of the return spring 244. The pressure reduction valve 246 remains open under the action of the valve spring 254 until the valve shaft of the valve element 242 strikes against the housing. Cooling oil is again sucked out of the reservoir 222 during this "suction stroke."

The piston device 230 according to FIGS. 2a and 2b has pressure-converting characteristics. On the side of the interior space 250, the piston has a second piston surface 280 which is appreciably larger than the first piston surface 262 or the effective piston surface formed by the first piston surface 262 and the pressure receiving surface 264. Due to this, other effective piston surface 262, 264 on the side of the pressure oil drawn from the pump 208 and the larger piston surface on the side of the cooling oil drawn from the reservoir 222, a greater pressure in interior space 260 can balance out a small pressure in interior space 250, and the forces exerted on the piston 234 by the return spring 254 are also taken into account in addition. In practical operation of the piston device 230, an equilibrium state of this kind need not occur, the pressure in the interior space 250 can be substantially less than an equilibrium pressure corresponding to a pressure conversion according to the piston surfaces depending on the flow resistance through the check valve 266, the connection 240, an oil connection to the dual clutch 206 and an effective flow resistance of the dual clutch 202 and a return line into the reservoir 222 during the entire discharge stroke when the pressure reduction valve is closed.

The piston device 230 makes it possible that through the intermediary of the small piston surface 262, 264 on the pressure oil side and by means of the high pressure of the pressure oil and through the intermediary of the large piston surface 280 on the cooling oil side at low pressure, a volume quantity conveyed for cooling the clutch is greater than the amount of pressure oil supplied to the piston device via the valve 218. Therein, a pressure compensation opening 282 is provided in the housing 238 so that pressure compensation opening 282 is connected to the reservoir 222 in order to prevent the piston 234 from sticking in its stop position shown in FIG. 2a due to a vacuum.

The check valve 252 serves to prevent cooling oil from flowing out of the interior space 250 back into the reservoir 222. Alternatively, this check valve 252 could also be formed in the piston as is indicated in dashed lines at 252'. In this case, a connection of the piston device associated with the pressure compensation opening 282 will be sufficient and connection 238 could be dispensed with. The check valve 266 prevents cooling oil from the side of the dual clutch from flowing back into the interior space 250.

The piston device 230 works to supply fresh oil continuously to the dual clutch 202 with reciprocating pistons and consequently with a pulsed delivery of fresh oil to the dual clutch 202. Therefore, the piston device 230 may also be called a pulse delivery pump. Vibrations can occur under certain circumstances due to the oscillating motion of the piston. In order to remedy this, two piston devices 230 can be operated in parallel and in opposite directions, that is, with a phase of the piston stroke that is offset by 180°, approximately in the manner shown in FIGS. 2a and 2b. Of course, both piston 230 devices can be constructed with an individual housing shared by both devices 230 and with common connections. It is also possible for more than two piston devices 230 to be connected in parallel and operated with mutually offset stroke phases for a more uniform supply of fresh oil.

FIG. 3 shows a rotor device 300 which can be used as component P 220 in the embodiment of FIG. 1. The rotor device 300 has at least one pressure medium connection 302 which is connected to the pump 208 either via the valve 218 or directly to a cooling connection, not shown in the drawing, which is connected to the reservoir 222 and from which cooling oil can flow via a check valve 304 in a housing 306 of the rotor device 300 which is constructed in multiple parts into a conveying rotor 308 having at least one conveying geometry, for example, a vane or blade shape.

Pressure oil flowing into the housing 306 via the connection 302 flows against at least one drive rotor 310 which is constructed with at least one pulse geometry or rotational pulse receiving geometry, for example, a vane shape, and is set in rotation by the pressure oil.

FIG. 4 shows a possible construction of the drive rotor 310 in detail. A plurality of drive blades 312 is shown. The pressure oil which is directed through a supply channel 314 to the drive blade 312 sets the drive rotor 310 in rotation in the direction indicated by arcuate arrow 315. After interacting with the rotor 310, the pressure oil which has now given off a portion of its energy flows off via a flow-off channel 316.

Figure 6:
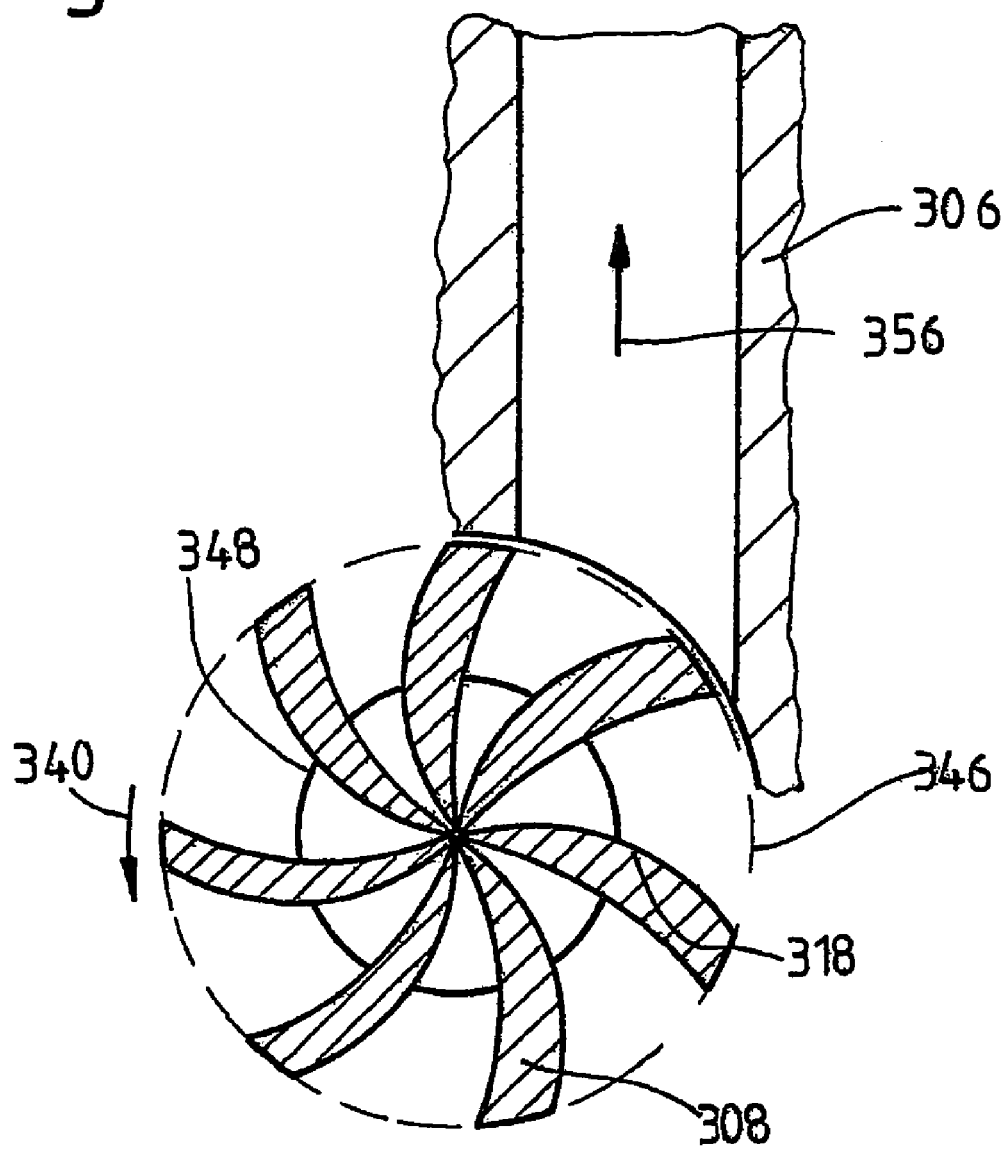
FIG. 6 is a partial cross-sectional view along section VI—VI of FIG. 3 of a rotor of the rotor device which conveys an operating medium and which is driven by the pressure medium through the intermediary of the rotor of FIG. 4 or 5 and a rotational coupling of the two rotors.
Figure 7:
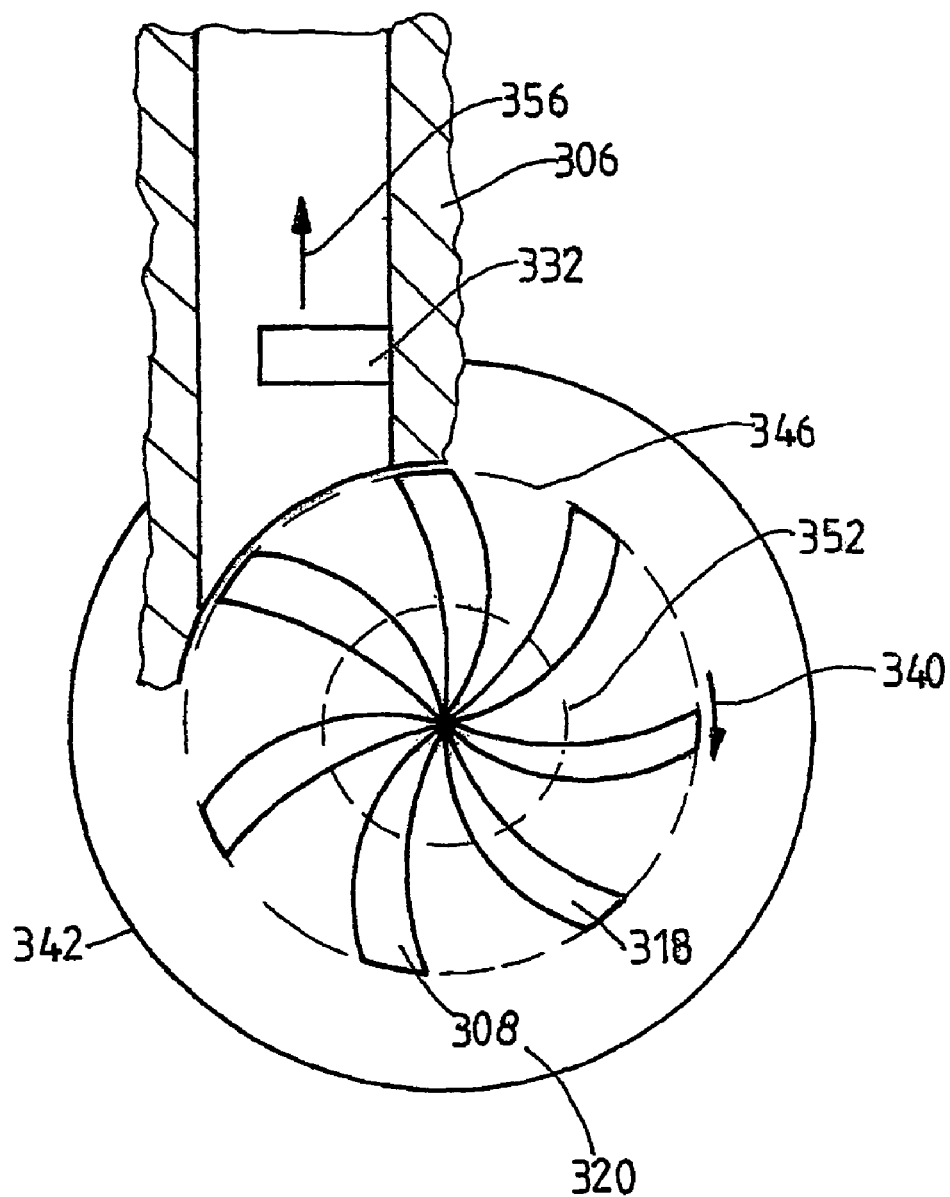
FIG. 7 is a partial cross-sectional view of the rotor of FIG. 6 along section VII—VII of FIG. 3.

The conveying rotor 308 is connected with the drive rotor 310 so as to be fixed with respect to rotation relative to it. FIG. 6 and FIG. 7 illustrate embodiments of conveying structures, which in this case are blade-shaped, herein conveying blades 318. In the embodiment, the drive blades 312 of the drive rotor 310 and the conveying blades 318 of the conveying rotor 308 are arranged at a rotating disk 320 which is mounted radially and axially in the housing 306. The disk 320 on the one hand and the drive rotor 310 formed by the drive blades 312 and a hub portion 322 and the conveying rotor 308 formed by the conveying blades 318 on the other hand can be constructed in one part or multiple parts. For example, it could possibly be produced as a plastic part in one piece.

According to the preceding, the conveying rotor 308 is driven in rotation by the pressure oil flowing against the drive rotor 310 via the channel 314 through the intermediary of the drive rotor 310. The rotation of the conveying rotor 308 generates a cooling oil flow from the reservoir 222 via the associated connection of the rotor device, the check valve 304 to the conveying rotor 308 and the cooling oil interacting with the conveying rotor 308 is guided via a flow-off channel 330 and a connection of the piston device associated with the dual clutch 202 to the dual clutch 302, or more exactly to its clutch devices 204 and 206. The conveying effect of the conveying rotor 308 relies on torsion imparted to the cooling oil and/or on the action of centrifugal force of the cooling oil accelerated through the intermediary of the conveying rotor 308, so that the rotor device 300 can also be designated as a swirl pump; specifically, as an impeller pump or centrifugal pump.

The flow-off channel 316 guiding the pressure oil opens at 332 into the supply channel 330, so that the pressure oil is conveyed together with the cooling oil to the dual clutch 202. In the embodiments of FIGS. 6 and 7, the pressure oil supplied by the pump 208 on the one hand and the cooling oil conveyed from the reservoir 222 to the dual clutch 202 on the other hand are the same medium, that is, a hydraulic oil.

The conveying structures, e.g. conveying blades 318, are shaped in such a way that large volume flows can be conveyed through the dual clutch 202 during a rotational movement of the conveying rotor 308 and cooling oil can flow from the reservoir 222 through the rotor device 300 to the dual clutch 202 when the conveying rotor 308 is stationary in the case of a self-priming clutch.

In one embodiment, pressure oil flows against the drive blades 312 of the drive rotor 310 radially and tangentially and the pressure oil flows off from the drive blades 312 tangentially or radially. The cooling oil that is sucked in flows against the blade geometries 318 of the conveying rotor 308 axially and the cooling oil flows off in radial direction. Other flow conditions are also possible. For example, flow can proceed against the drive rotor 310 axially.

The comparatively costly sliding bearing or rolling bearing for the bearing support of the rotors 308, 310 can be dispensed with when a lubricating film bearing is provided. The rotor device 300 can be constructed in such a way that a corresponding lubricating film is formed compulsorily based on the rotational movement, e.g., based on a hydrodynamic effect. However, supply openings can be provided through which small amounts of pressure oil and/or cooling oil are conducted to the lubrication points. An opening of this kind is shown at 334.

The rotating disk 320 serving to support the rotors 308, 310 can be provided at its circumference and/or at its axial end faces with a friction-reducing coating, e.g., PTFE, for a particularly low-friction bearing support. Accordingly, the transition from adhesive friction to sliding friction in particular is accelerated.

The rotational movement imparted to the conveying rotor 308 is represented in FIGS. 6 and 7 by arcuate arrow 340. The circular line 342 represents the outer circumference of the rotating disk 320. The dashed circular lines 344 of FIGS. 5 and 346 of FIGS. 6 and 7 do not represent design details of the rotor device 300, but rather correspond to the rotational movement path of the radial outer blade ends of the drive rotor and conveying rotor. The circular line 348 represents the inner circumference 350 of a cooling oil channel 352 in the interior of the housing 306 which guides cooling oil from the non-return valve 304 to the conveying rotor 308. The radial position of this inner circumference is also shown in FIG. 7 by a dashed circular line 352. The straight arrows 354 show the flow direction of the pressure oil to the drive rotor 310 and away from the latter. The straight arrows 356 show the flow direction of the cooling oil to the conveying rotor 308 and away from the latter.

Figure 5:
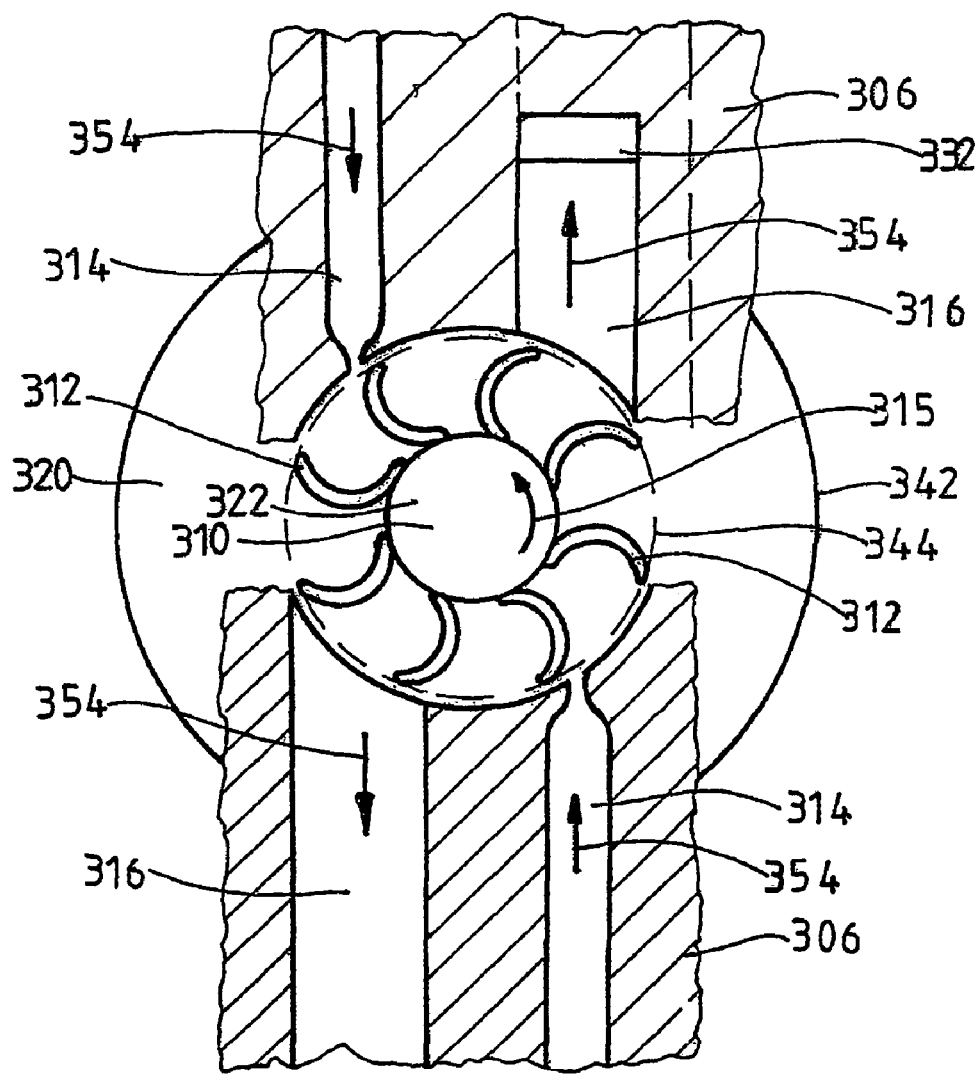
FIG. 5 is a partial cross-sectional view along section IV—IV of FIG. 3 of another embodiment of the rotor driven by pressure fluid with two pressure fluid supply channels and two pressure fluid discharge channels arranged symmetrically with respect to the axis of rotation of the rotor.

In order to ensure that the drive rotor 310 starts with the least friction possible, flow can proceed against the drive rotor 310 or its drive blades 312 in a rotationally symmetric manner. In the embodiment of FIG. 5, two supply channels 314 which are offset by about 180° and two flow-off channels 316 which are offset relative to one another by 180° are formed in the housing 306. For example, three supply channels which are offset by 120°, four supply channels which are offset by 90° relative to one another, etc., could be provided.

The function of the check valve 304 is referred to in the following. The check valve 304 generally ensures that no oil flows out of the rotor device 300 into the reservoir (compensation vessel) 222. In particular, pressure oil flowing via the connection 302 to the drive rotor 310 and from the latter via the flow-off channel 316 into the channel 360 is prevented from flowing off into the reservoir 222. The fact is that at low temperatures the cooling oil in the reservoir 222 can be quite viscous and, therefore, under some circumstances, e.g., after the motor vehicle has stood for a long time, can not be sucked in immediately in sufficient quantities. The pressure oil flowing into the channel 360 then ensures a minimum supply of cooling medium to the clutch device.

Figure 8:
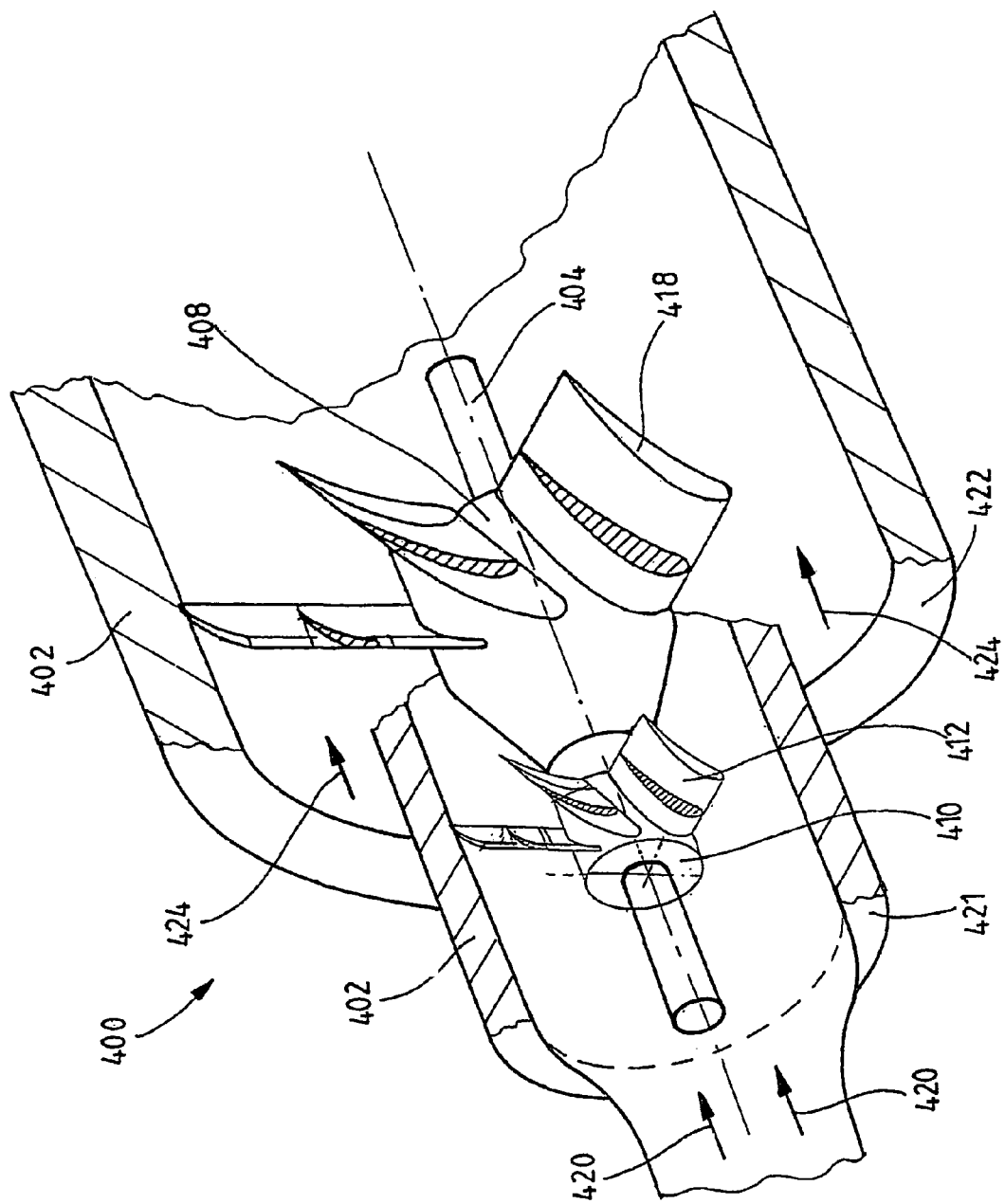
FIG. 8 is a sectional perspective view of one embodiment of a rotor device that serve as pump or pressure converter and that is usable as component P in the arrangement of FIG. 1.

Another rotor device 400 which can be used as component P (220) in the embodiment of FIG. 1 is shown in a perspective view in FIG. 8. The rotor device 400 has a rotating shaft 404 which is rotatably mounted in a housing 402. The rotating shaft 404 has at least one drive rotor 410 with pulse or rotary pulse receiving structures, in this case especially blades 412, and at least one conveying rotor 408 with conveying structures, such as blades 418. The drive rotor 410 is associated with a high-pressure turbine drive and pressure oil flows against it axially as is indicated by the arrow 420. Referring to the embodiment of FIG. 1, this pressure oil having a relatively high pressure is supplied by the pump 208 which is connected via the valve 218 or directly to a connection of the rotor device 400 associated with the drive rotor 410.

The housing 402 has a radial inner cylinder 421 and a radial outer cylinder 422. The inner cylinder 421 receives the drive rotor 410 and guides the pressure oil in an axial flow to the drive rotor 410. Between the outer cylinder 422 and the inner cylinder 421, a cooling oil pressure flow represented by arrow 424 is guided axially to the conveying rotor 408 which is arranged at the other side of an axial end of the inner cylinder 421 and whose blades 418 extend farther radially outward than the outer circumference of the inner cylinder 421. The pressure oil which has passed the drive rotor 410 exits from the inner cylinder 421 and flows together with the cooling oil in the region of the conveying rotor 408.

In addition to the rotors 408 and 410, which are shown in FIG. 8 and which can also be referred to as impellers, conducting devices that are stationary with respect to the housing 402 can be provided in order to make efficient use of the kinetic energy of the pressure oil for the driving of the drive rotor 410 and therefore (via shaft 404) for the driving of the conveying rotor 408 and in order to convey the cooling oil through the intermediary of the conveying rotor 408 in an efficient manner. Therein, the conveying effect of the rotating conveying rotor 408 is based on the fact that angular momentum or swirl is imparted to the pressure oil. Accordingly, one can say that the conveying rotor 408 forms a swirl conveying pump.

In a corresponding manner, as in the case of the rotor device 300, the radial bearing and axial bearing supporting the rotors 408, 410, that is, the radial bearing and axial bearing supporting the shaft 404, can provide a lubricating film bearing which compulsorily forms during the rotational movement, particularly in a hydrodynamic manner. A compulsory lubrication can also be provided by supplying pressure oil and/or cooling oil. Also, for the embodiment of FIG. 8, a coating, e.g., of the bearing portions of the rotating shaft 404, for example, a PTFE coating, is advantageous for reducing friction so that the mixed friction region can be traversed more quickly when accelerating.

When the conveying rotor 408 is stopped, conveying oil which is sucked in through a self-priming dual clutch can flow through the blade geometries 418 of the conveying rotor 408 without excessive flow resistance.

The embodiments of FIGS. 2a and 2b and those of FIGS. 3–8 have important differences. With regard to the conveying of the cooling oil, the piston device 230 works as a hydrostatic pump or, viewed in another way, as a positive-displacement machine. In contrast, the rotor devices 300 and 400 which can be designated as swirl conveying pumps with respect to the conveying of cooling oil operate as hydrodynamic pumps or, viewed in another way, as liquid flow machines. Such hydrodynamic pumps or flow machines are particularly well suited for generating high volume flows, whereas hydrostatic pumps or positive-displacement machines, especially piston pumps or piston machines, are not necessarily the first choice for generating higher volume flows. Since, on the other hand, hydrostatic pumps or positive-displacement machines, particularly piston pumps, are generally more suitable for generating high pressures than are hydrodynamic pumps or flow machines, the pump 208 supplying the pressure oil is constructed as a hydrostatic pump or positive-displacement machine in a particularly preferred construction of the embodiment of FIG. 1.

Figure 9:
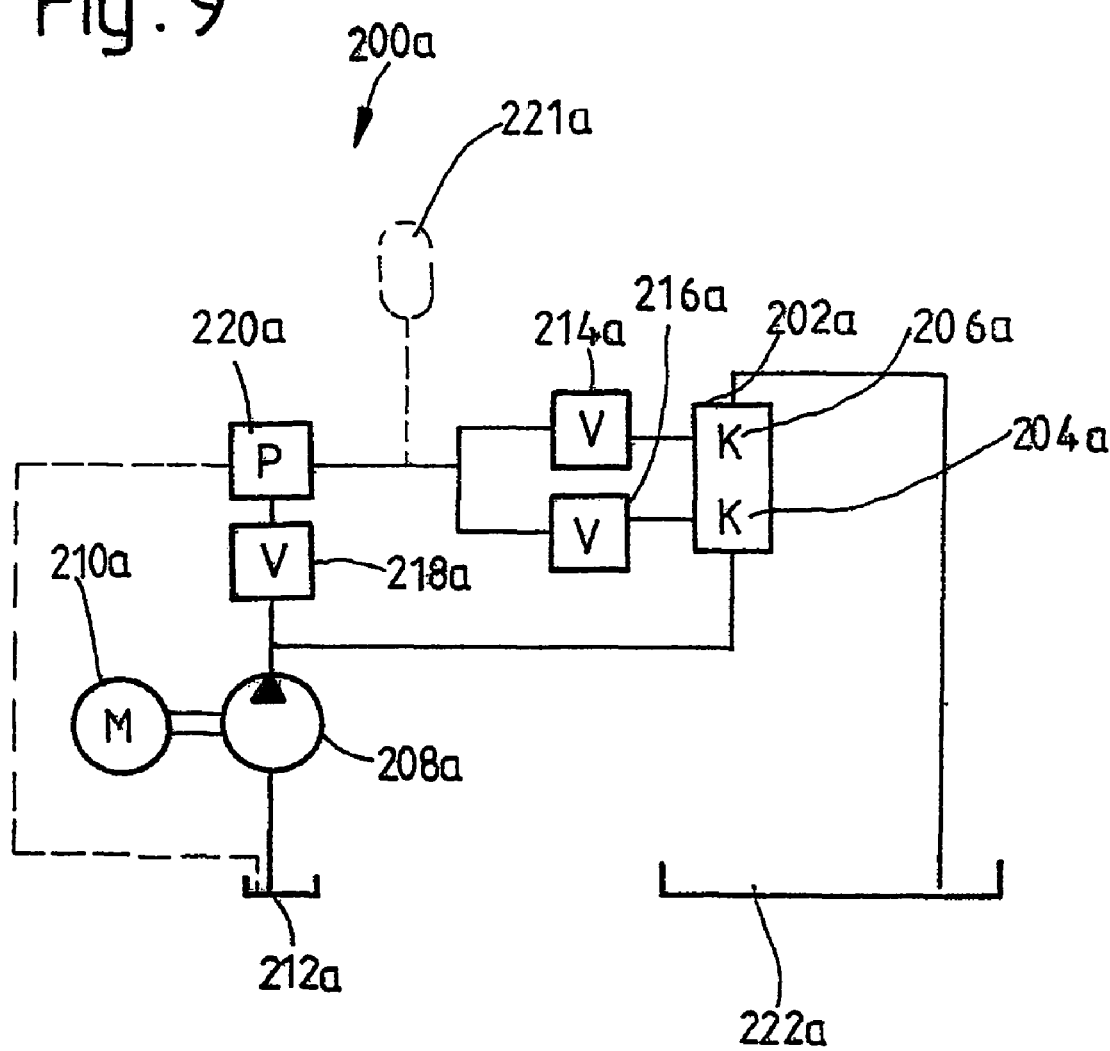
FIG. 9 is a schematic view of one embodiment of a clutch system having a wet dual clutch.

In the embodiments described above, a comparatively large flow of cooling medium, particularly cooling oil, which is at comparatively low pressure is generated through the intermediary of a pressure medium, particularly pressure oil, having a comparatively high pressure and through the intermediary of a comparatively small volume flow of this pressure medium. Conversely, a (possibly comparatively smaller) pressure medium flow, particularly a flow of pressure oil, can also be generated with comparatively high pressure through the intermediary of a cooling medium flow, particularly a flow of cooling oil at comparatively low pressure by using a corresponding pressure converter. FIG. 9 shows an embodiment for a clutch system according to the present invention. The pump 208a is driven by the electric motor 210a and is designed for supplying a large-volume flow of cooling oil for cooling the clutch arrangements 204a and 206a of the dual clutch 202a, wherein the pump 208a generates a cooling oil pressure that would not be sufficient in terms of pressure to actuate the clutch devices 204a and 206a. A pressure converter 220a, component P, is connected to the cooling oil pump 208a, possibly via a valve 218a, and supplies pressure oil at a pressure level sufficient for actuating the clutch devices 204a and 206a under the influence of the cooling oil. For this purpose, the clutch devices are connected to component P 220a via the valves 214a and 216a. Component P 220a can be connected to the reservoir 112a by means of a separate line in order to suck hydraulic oil out of the latter and/or to deliver hydraulic oil to the reservoir depending on the construction and function of component P 220a. In one embodiment, component P 220a can be constructed as a positive-displacement machine or flow machine, possibly a hydrostatic pump or hydrodynamic pump, in a manner analogous to that discussed with reference to the piston device 230 and the rotor devices 300 and 400, wherein, however, a small input pressure is converted to a high output pressure. In one embodiment, component P 220a is a piston device similar to piston device 230, wherein a large piston surface is associated with the cooling oil and a small piston surface is associated with the pressure oil to be put under pressure.

Since a comparatively large volume flow is required for cooling the dual clutch, the pump 208a can advantageously be constructed as a hydrodynamic pump.

Figure 10:
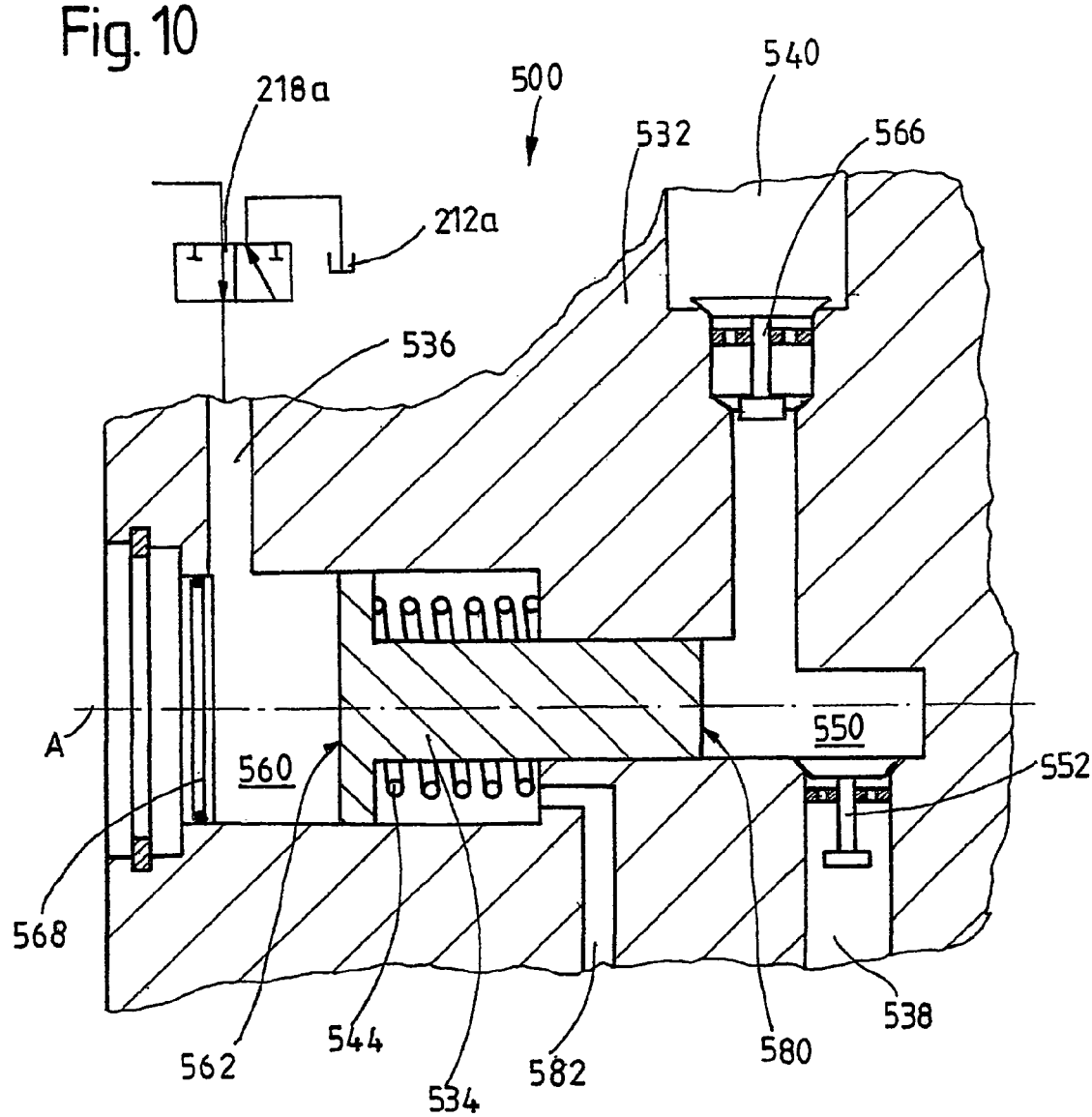
FIG. 10 is a partial cross-sectional view of a piston device that is usable as a pressure converter or pump and that can be used as component P of the arrangement of FIG. 9.

FIG. 10 shows a piston device 500 which can be used as component P 220a in the embodiment of FIG. 9 and which is connected, for example, to the valve 218a of the embodiment of FIG. 9. Analogous to the description of the piston device 230 of FIG. 2 in the following is a description of piston device 500, wherein only the differences between the piston devices will be emphasized.

The piston device 500 is connected via its connection 536 and valve 218 to the cooling oil pump 208a. The valve 218a accordingly lets cooling oil into the interior space 560 corresponding to the pressure generated by the pump 208a for bringing about a "discharge stroke" against the action of the return spring 544 and lets off cooling oil contained in the interior space 560 in the reservoir 212a to reduce the pressure in the interior space 560 in order to initiate or permit a "suction stroke" under the action of the return spring 544. During the suction stroke, hydraulic oil is sucked out of one of the reservoirs 212a and 222a, for example, into the interior space 550 via the connection 538 and the check valve 552. During the discharge stroke, corresponding to the axial displacement of the piston 534 to the right, hydraulic oil is supplied as pressure oil from the interior space 550 via the check valve 566 and the connection 540 to an actuating pressure oil circuit which can be constructed as a pressure oil reservoir in order to supply a uniform pressure level for the clutch actuation. A reservoir 221a of this kind is shown in dashed lines in FIG. 9 as one embodiment of the clutch system. This reservoir 221a can easily be associated with respect to construction and/or function with component P 220a, e.g., integrated into component P 220a.

Piston 534 has a first piston surface 562 which is exposed to the cooling oil in the interior space 560 and which is appreciably larger than the second piston surface 580 which is arranged at the other end of the piston and which is exposed to the hydraulic oil that is contained in the interior space 550 and is to be supplied for clutch actuation. Therefore, also taking into account the axial forces exerted on the piston surface 562 by the return spring 544, the comparatively lower pressure in the interior space 560 can be converted into a comparatively high pressure in interior space 550, so that the pressure oil flowing off via the connection 540 is at a pressure level which is sufficient for reliable actuation of one or both clutch arrangements 204a and 206b.

Figure 11:
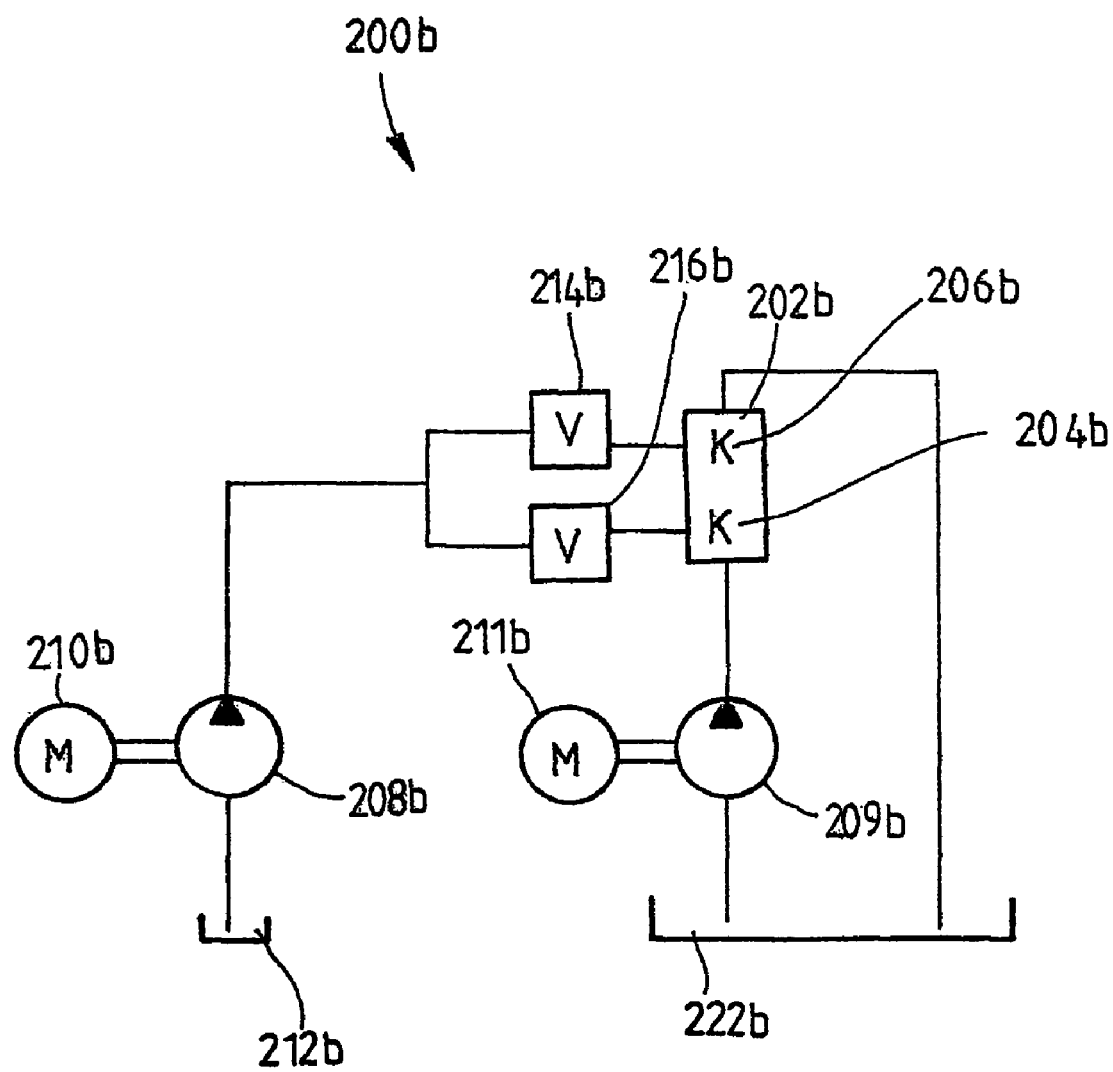
FIG. 11 is a schematic view of an embodiment of a clutch system with two pumps which are associated with a wet dual clutch and are driven by electric motor.

FIG. 11 illustrates one embodiment of a clutch system of another approach and which has two mutually independent pumps. A first pump 208b and a second pump 209b are provided and are driven by an electric motor 210b and 211b, respectively. The first pump 208b which is driven by an electric motor 210b and which is preferably constructed as a hydrostatic pump or positive-displacement machine supplies pressure medium, particularly pressure oil, at a comparatively high pressure which is sufficient to actuate the clutch devices 204b and 206b of the dual clutch 202b. For selective actuation of the clutch devices, these clutch devices are connected to the pump 208b via an associated valve 214b or 216b.

The second pump 209b which is driven by an electric motor 211b and which is preferably constructed as a hydrodynamic pump or turbine pump supplies a comparatively large volume flow of cooling medium, particularly cooling oil, which is sufficient for cooling the clutch devices 204b and 206b. The pressure delivered by the pump 209b can be appreciably less than the pressure delivered by the pump 208b.

Figure 12:
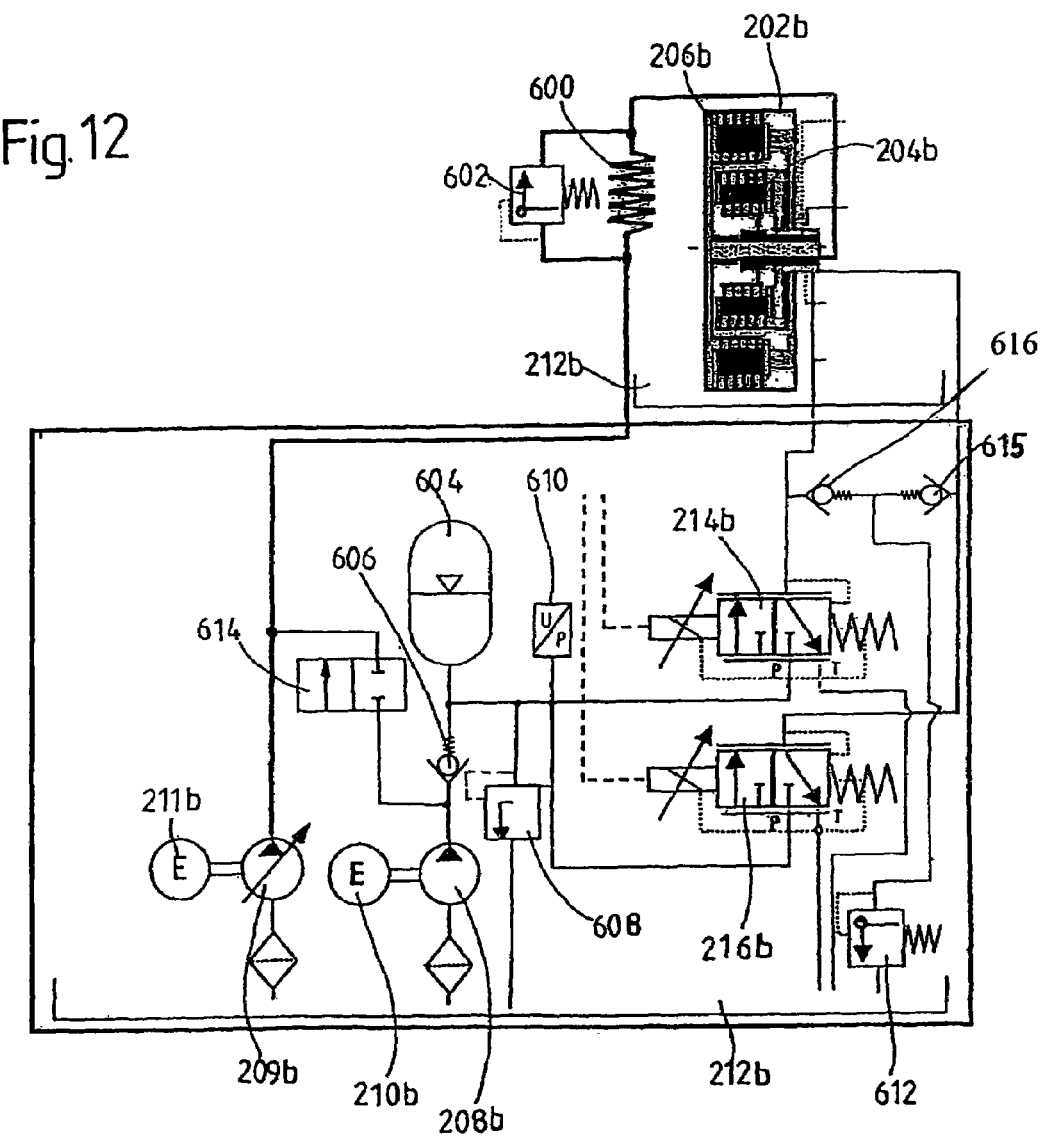
FIG. 12 is a schematic example of how a clutch system of the type corresponding to FIG. 11 could actually be constructed.

FIG. 12 shows one embodiment with two pumps which are driven independently, preferably by electric motors. The reference numbers in FIG. 11 are also used in FIG. 12 insofar as the various components of the clutch system of FIG. 12 correspond to the components of the arrangement according to FIG. 11.

Fundamentally, the cooling of the dual clutch 202b requires a high volume flow at comparatively low pressure, the electrically driven pump 209b is preferably a hydrodynamic pump, for example, an impeller pump. Since the clutch arrangements must generally only be cooled very intensively when stopping or starting, it is sensible to construct and control this pump 209b in such a way that the rotational speed is controlled or regulated corresponding to the cooling requirement as is indicated in FIG. 12 by a pump symbol with an arrow. Very high conveying flows can be achieved with a hydrodynamic pump, particularly an impeller pump. For example, in a conventional impeller pump the conveying flow increases in proportion to the square of the pumping speed.

In FIG. 12, the cooling oil is supplied to the dual clutch 202b via a heat exchanger 600, since a noticeable increase in temperature can come about also in the oil in the oil pan 212b, for example, in case of a long slip operation. The oil temperature is maintained at a temperature level sufficient for cooling the dual clutch 202b by means of the heat exchanger 600. Since the cooling oil can be quite viscous at lower temperatures and in certain cases cooling oil would no longer reach the dual clutch 202b in sufficient quantities because of the flow resistance of the heat exchanger 600 at especially low temperatures, a bypass valve 602 which is pretensioned by a spring, for example, is provided which opens when the cooling oil pressure downstream of the oil cooler 600 exceeds a predetermined pressure threshold and lets the cooling oil past the oil cooler 600 to the dual clutch.

As previously stated, a comparatively small volume flow at relatively high pressure is needed to actuate the actuation piston of the two clutch devices 204b and 206b. Consequently, the pump 208b which is driven by electric motor 210b is preferably a hydrostatic pump, e.g., a toothed gear pump or vane cell pump.

In the embodiment example in FIG. 12, a pressure oil storage 604 having a gas cushion under pressure is installed in the clutch actuation pressure oil circuit and is charged by the pump 208b via a check valve 606 and is connected via valve 214b and valve 216b to the actuation slave cylinders of the two clutch devices 204b and 206b. The pressure oil storage 604 provides for a uniform pressure level which is particularly advisable in case the pump 208b is constructed as a piston pump and allows a pump with a particularly small conveying volume to be used as pump 208b. Thus, the oil volume delivered by the pump 208b per time unit can be less than the pressure oil volume required per time unit during actuation of the dual clutch 202b.

The pressure oil circuit between the check valve 606 and the valves 214b and 216b is protected against excessively high pressure of the pressure oil which could possibly result in damage by means of a pressure limiting valve 608. The pressure determined by the fluid level of the storage 604 is detected by a pressure sensor 610 in this pressure oil circuit.

Another pressure limiting valve 612 ensures that the pressure prevailing on the other side of the valves 214b and 216b and acting on the hydraulic slave cylinders of the clutch devices does not exceed a maximum value, for example, in order to prevent possible damage. Due to two check valves 615 and 616, one pressure limiting valve is sufficient for monitoring the actuation pressure of two hydraulic slave cylinders.

When the pressure of the cooling oil is not sufficient to cool the clutch at low temperatures, that is, in case of high oil viscosity, for example because the hydrodynamic pump used for pump 209b can not generate sufficient pressure, a valve 614 is provided in the embodiment according to FIG. 12, through which valve 614 a small volume flow can be branched off from the cooling oil flow supplied by the pump 208b in order to provide a kind of "emergency cooling" of the clutch disks when required. Since the high viscosity of the cooling oil which makes it necessary to open the valve 614 occurs only at low temperatures at which there is only a low cooling requirement for the dual clutch in any case, a relatively small "emergency cooling oil flow" is sufficient. Moreover, this emergency cooling is only required until the temperature of the oil and, accordingly, the viscosity of the oil is sufficient to ensure adequate pumping output of the cooling oil pump 209b. Instead of a valve 614, a diaphragm, choke, or the like could also be provided by which a small volume flow is continuously branched off from the pressure oil flow supplied by the pump 208b in the cooling circuit. When using the valve 614 which branches off the cooling oil when needed, the pump 208b may be operated briefly in overload operation in order to supply sufficient cooling oil within the short time period before the oil is sufficiently heated. Since the time periods when this is required are generally only very short, the life of the pump 208b is not substantially shortened in this way.

Figure 13:
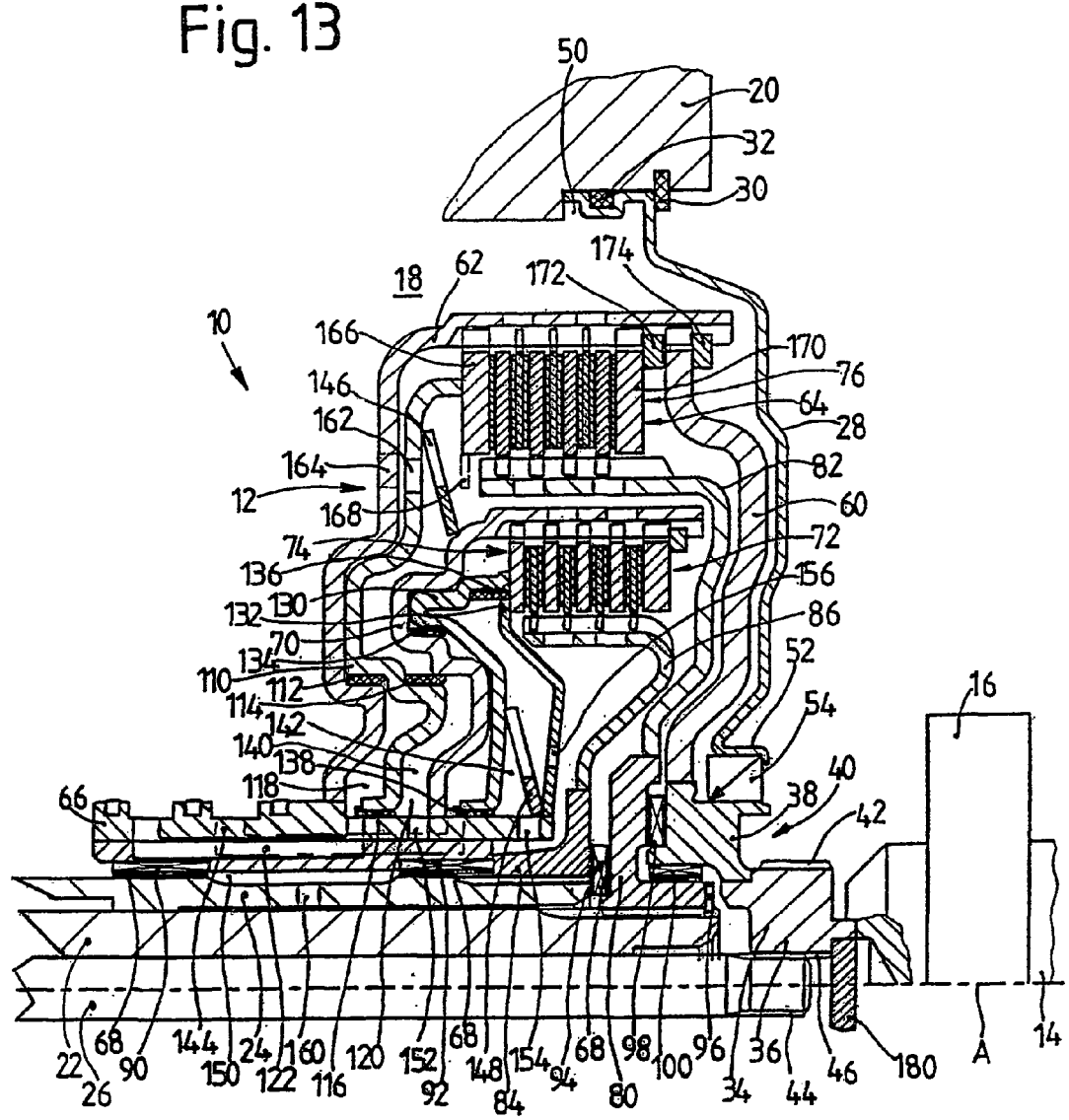
FIG. 13 is a partial cross-sectional view of a dual clutch with two multi-disk clutch arrangements wherein the dual clutch is arranged in a drivetrain of a motor vehicle between a transmission and a drive unit and which could be the component part of a clutch system according to the present invention.

FIG. 13 shows a dual clutch 12 arranged in a drivetrain 10 between a drive unit and a transmission. The only part of the drive unit, e.g., an internal combustion engine, shown in FIG. 13 is a driven shaft 14, possibly a crankshaft 14, with a coupling end 16 serving to couple a torsional vibration damper, not shown. The transmission is represented in FIG. 13 by a transmission housing portion 20 defining a transmission housing casing 18 and two transmission input shafts 22 and 24, both of which are constructed as hollow shafts. Transmission input shaft 22 extends through transmission input shaft 24 essentially coaxial thereto. A pump drive shaft which serves to drive an oil pump on the transmission side, not shown in FIG. 13, is arranged in the interior of the transmission input shaft 22 as will be discussed further. When at least one oil pump driven by electric motor is provided, the pump drive shaft can be dispensed with.

The dual clutch 12 is received in the transmission housing casing 18, wherein the interior of the casing is closed in the direction of the drive unit by a cover 28 which is pressed into a casing housing opening and/or is secured therein by a snap ring 30. When the dual clutch 12 has wet friction clutches, for example, disk clutches, as in the embodiment shown in FIG. 13, it is generally arranged so as to ensure a tight engagement between the cover 28 and the clutch housing formed by the transmission housing casing 18. This tight engagement can be produced, for example, by means of an O-ring or some other sealing ring. FIG. 13 shows a sealing ring 32 with two sealing lips.

A clutch hub 34 comprising two annular portions 36, 38 secured to one another for reasons which will be explained in the following serves as input side of the dual clutch 12. The clutch hub 34 extends through a central opening of the cover 28 in the direction of the drive unit and is coupled via an external toothing 42 with the torsional vibration damper, not shown, so that there is a torque-transmitting connection between the coupling end 16 of the crankshaft 14 and the coupling hub 34 by means of this torsional vibration damper. If a torsional vibration damper is not desired at this location in the drivetrain, or at all, the clutch hub 34 can also be coupled directly to the coupling end 16. The pump drive shaft 26 has an external toothing 44 at the end remote of the transmission which engages in an internal toothing 46 of the annular portion 36 of the clutch hub 34, so that the pump drive shaft 26 rotates along with the clutch hub 34 and accordingly drives the oil pump when a rotational movement is imparted to the clutch hub 34, generally by the drive unit and in many operating situations possibly also by the transmission via the dual clutch 12 (for example, in an operating situation characterized by the term "engine braking").

The cover 28 extends radially between an annular circumferential wall portion of the housing casing 18 defining a radial recess 50 of the housing casing 18 and the annular portion 38 of the hub 34. It is advantageous when a seal arrangement and/or pivot bearing arrangement 54 is provided between a radial inner wall area 52 of the cover 28 and the hub 34, especially the annular portion 38, especially when—as in the embodiment illustrated the cover 28 is secured to the housing casing 18 and therefore does not rotate along with the dual clutch 12. A seal between the cover and the hub is required particularly when the clutch arrangements of the dual clutch are wet clutches as in the embodiment example. Highly reliable operation is also achieved in case of occurring oscillations and vibrations when the seal arrangement and/or pivot bearing arrangement 54 are/is secured axially at the cover 28 and/or at the clutch hub 34, for example, by an end portion of the cover edge of radial inner wall area 52 that is bent radially inward, as is shown in FIG. 13.

A support plate 60 which serves to transmit torque between the hub 34 and an outer disk carrier 62 of a first multi-disk clutch arrangement 64 is arranged at the annular portion 38 of the hub 34 so as to be fixed with respect to rotation relative to it. Referring to the embodiments of FIGS. 1, 9, 11 and 12, the multi-disk clutch arrangement 64 can be identified, for example, as clutch arrangement 204, 204a or 204b. The outer disk carrier 62 extends in the direction of the transmission and radially inward to an annular part 66 at which the outer disk carrier 62 is arranged so as to be fixed with respect to rotation relative to it and which is rotatably supported at the two transmission input shafts 22 and 24 by means of an axial and radial bearing arrangement 68 in such a way that radial as well as axial forces are supported at the transmission input shafts. The axial and radial bearing arrangement 68 makes possible a relative rotation between the annular part 66 on the one hand and transmission input shaft 22 and transmission input shaft 24 on the other hand. The construction and operation of the axial and radial bearing arrangement 68 will be discussed more fully later on.

An outer disk carrier 70 of a second multi-disk clutch arrangement 72 is arranged at the annular part 66 farther axially in the direction of the drive unit so as to be fixed with respect to rotation relative to it, its disk stack 74 being surrounded annularly by the disk stack 76 of the first multi-disk clutch arrangement.

Referring to the embodiments of FIGS. 1, 9, 11 and 12, the second multi-disk clutch arrangement 72 can be identified, for example, as clutch arrangement 206, 206a or 206b. As was already indicated, the two outer disk carriers 62 and 70 are connected with one another by the annular part 66 so as to be fixed with respect to relative rotation and are jointly in a torque-transmitting connection with the clutch hub 34 and therefore—via the torsional vibration damper, not shown—with the crankshaft 14 of the drive unit by means of the carrier plate 60 which is in a positive-locking torque-transmitting engagement with the outer disk carrier 62 by means of an external toothing.

Referring to the normal flow of torque from the drive unit to the transmission, the outer disk carriers 62 and 70 serve as input side of the multi-disk clutch arrangement 64 and 72, respectively.

A hub part 80 of an inner disk carrier 82 of the first multi-disk clutch arrangement 64 is arranged on the transmission input shaft 22 so as to be fixed with respect to rotation relative to it by means of a spline or the like. In a corresponding manner, a hub part 84 of an inner disk carrier 86 of the second multi-disk clutch arrangement 72 is arranged on the radial outer transmission input shaft 24 so as to be fixed with respect to rotation relative to it by means of a spline or the like. Referring to the regulating torque flow from the drive unit in the direction of the transmission, the inner disk carriers 82 and 86 serve as output side of the first and second multi-disk clutch arrangements 64 and 72.

Referring again to the radial and axial bearing support of the annular part 66 at the transmission input shafts 22 and 24, two radial bearing subassemblies 90 and 92 acting between the radial outer transmission input shaft 24 and the annular part 66 serve as radial support of the annular part 66. With regard to a support in the direction of the drive unit, the axial bearing support of the annular part 66 is carried out by means of hub part 84, an axial bearing 94, hub part 80 and a snap ring 96 which secures the hub part 80 axially to the radial inner transmission input shaft 22. The annular part 38 of the clutch hub 34 is supported in turn via an axial bearing 68 and a radial bearing 100 at the hub part 80. The hub part 80 is supported axially in the direction of the transmission at an end portion of the radial outer transmission input shaft 24 by the axial bearing 94. Hub part 84 can be supported at the transmission input shaft 24 directly at an annular stop or the like or at a separate snap ring or the like in the direction of the transmission. Since the hub part 84 and the annular part 66 are rotatable relative to one another, an axial bearing can be provided between these components insofar as the bearing 92 does not function as both axial bearing and radial bearing. The latter is assumed with regard to the embodiment of FIG. 13.

Great advantages result when, as in the present embodiment, the portions of the outer disk carriers 62 and 70 extending in radial direction are arranged on one axial side of a radial plane extending orthogonal to an axis A of the dual clutch 12 and the portions of the inner disk carriers 82 and 86 of the two multi-disk clutch arrangements 64, 72 extending in radial direction are arranged on the other axial side of this radial plane. This allows a particularly compact construction, particularly when—as in the present embodiment—disk carriers of one type (outer disk carrier as in the embodiment example or inner disk carrier) are connected with one another so as to be fixed with respect to relative rotation and serve in each instance as the input side of the respective multi-disk clutch arrangement 64, 72 with respect to the flow of force from the drive unit to the transmission.

Actuation pistons for actuating the multi-disk clutch arrangements 64, 72 are integrated in the dual clutch 12 in order to actuate the multi-disk clutch arrangements 64, 72 for engagement in the case of the present embodiment. An actuation piston 110 associated with the first multi-disk clutch arrangement 64 is arranged axially between the radially extending portion of the outer disk carrier 62 of the first multi-disk clutch arrangement 64 and the radially extending portion of the outer disk carrier 70 of the second multi-disk clutch arrangement 72 and is guided so as to be axially displaceable at both outer disk carriers and at the annular portion 66 by means of seals 112, 114, 116 and so as to seal a pressure chamber 118 formed between the outer disk carrier 62 and the actuation piston 110 and a centrifugal force pressure compensation chamber 120 formed between the actuation piston 110 and the outer disk carrier 70. The pressure chamber 118 communicates, via a pressure medium channel 122 formed in the annular portion 66, with a pressure control device, such as a control valve (possibly valve 214, 214a or 214b) which is connected to a pressure medium supply, possibly the oil pump already mentioned above or pump 208 or 208b or component P (220a). The pressure medium channel 122 is connected to the pressure control device via a connection sleeve which receives the annular part 66 and which is possibly fixed with respect to the transmission. With regard to the annular part 66, for a simpler manufacture particularly with respect to the pressure medium channel 122 and another pressure medium channel, this annular part 66 is produced in two parts with two sleeve-like ring part segments which are inserted one into the other as shown in FIG. 13.

An actuation piston 130 associated with the second multi-disk clutch arrangement 72 is arranged axially between the outer disk carrier 70 of the second multi-disk clutch arrangement 72 and a substantially radially extending wall part 132 arranged at an axial end region of the annular part 66 remote of the transmission so as to be fixed with respect to rotation relative to it and so as to be tight against fluid and is guided so as to be axially displaceable by means of seals 134, 136 and 138 at the outer disk carrier 70, the wall part 132 and the annular part 66 and so as to seal a pressure chamber 140 formed between the outer disk carrier 70 and the actuation piston 130 and a centrifugal force pressure compensation chamber 142 formed between the actuation piston 130 and the wall part 132. The pressure chamber 140 is connected via another pressure medium channel 144 (already mentioned) in a manner corresponding to pressure chamber 118 at a/the pressure control device (possibly valve 216, 216a or 216b in connection with the pump 208 or pump 208b or component P 220a). Pressure applied by the (respective) pressure medium source (possibly oil pump) can be applied to the two pressure chambers 118 and 140 selectively (possibly also simultaneously) by means of the pressure control device(s) in order to actuate the first multi-disk clutch arrangement 64 and/or the second multi-disk clutch arrangement 72 for purpose of engagement. Diaphragm springs 146, 148 serve to restore, that is, to release, the dual clutches 12; the diaphragm spring 148 associated with the actuation piston 130 is received in the centrifugal force pressure compensation chamber 142.

The pressure chambers 118 and 140 are completely filled with pressure medium (in this case hydraulic oil) when during normal operating states of the dual clutch 12 and the actuating state of the multi-disk clutch arrangements 64, 72, per se, depends on the pressure of the pressure medium applied to the pressure chambers. However, since the outer disk carriers 62 and 70, including the annular part 66 and the actuation piston 110 and 130 and the wall part 132, rotate together with the crankshaft 14 in driving operation, pressure increases in the pressure chambers 118 and 140 which are caused by centrifugal force are brought about even when no pressure is applied to the pressure chambers on the part of the pressure control device, which increases could lead to an unwanted engagement or at least slippage of the multi-disk clutch arrangements at least at higher rotational speeds. The centrifugal force pressure compensation chambers 120, 142, which receive a pressure compensation medium and in which pressure increases occur correspondingly as a result of centrifugal force, which pressure increases compensate for the pressure increases caused in the pressure chambers by centrifugal force, are provided for this reason.

It is also possible to fill the centrifugal force pressure compensation chambers 120 and 142 permanently with pressure compensation medium, for example, oil, wherein, as the case may be, a volume compensation could be provided to absorb pressure compensation medium displaced in the course of actuating the actuation pistons. In the embodiment of FIG. 13, the centrifugal force pressure compensation chambers 120, 142 are first filled with pressure compensation medium during operation of the drivetrain, specifically in connection with the supply of cooling fluid, particularly cooling oil in the present embodiment, to the multi-disk clutch arrangements 64 and 72 via an annular channel 150 formed between the annular part 66 and the outer transmission input shaft 24, with which the bearings 90, 92 which pass the cooling oil are associated. The cooling oil which is supplied, by component P 220 or pump 208*a* or 209*b* flows from a transmission-side connection between the annular part and the transmission input shaft 24 in the direction of the drive unit through bearing 90 and bearing 92 and then flows in a partial flow between the end portion of the annular part 66 remote of the transmission and the hub part 84 radially outward in the direction of the disk stack 74 of the second multi-disk clutch arrangement 72, enters the area of the disks of the disk stack 79 through the passages in the inner disk carrier 86, flows radially outward between the disks of the disk stack 74 and through friction lining grooves, or the like, of these disks, enters the area of the disk stack 76 of the first multi-disk clutch arrangement 64 through passages in the outer disk carrier 70 and through passages in the inner disk carrier 82, flows radially outward between the disks of disk stack 76 and through lining grooves, or the like, in these disks and then, finally, flows off radially outward through passages in the outer disk carrier 62. The centrifugal force pressure compensation chambers 120, 142 are also connected to the cooling oil supply between the annular part 66 and the transmission input shaft 24, specifically by means of radial bore holes 152, 154 in the annular part 66. Due to the fact that the cooling oil serving as pressure compensation medium in the pressure compensation chambers 120, 142 flows off out of the pressure compensation chambers due to the absence of centrifugal force when the drive unit is stationary, the pressure compensation chambers are refilled again during the operation of the drivetrain (of the motor vehicle).

Since a pressure application surface of the actuation piston 130 associated with the pressure chamber 140 is smaller and also does not extend as far radially outward as a pressure application surface of the piston 130 associated with the pressure compensation chamber 142, at least one fluid level limiting opening 156 is formed in the wall part 132 and adjusts a maximum radial fluid level of the pressure compensation chamber 142 providing the required centrifugal force compensation. When the maximum fluid level is reached, the cooling oil supplied via the bore hole 154 flows off through the fluid level limiting opening 156 and combines with the cooling oil flowing radially outward between the annular part 66 and the hub part 84. For the piston 110, the pressure application surfaces of the piston which are associated with the pressure chamber 118 and the pressure application surfaces of the piston which are associated with the pressure compensation chamber 120 are of the same size and extend in the same radial area so that corresponding fluid level limiting means are not required for the pressure compensation chamber 120.

Additional cooling oil flows preferably occur in operation. Accordingly, at least one radial bore hole 160 is provided in the transmission input shaft 24, a further partial flow of cooling oil flows via this radial bore hole 160 and via an annular channel between the two transmission input shafts 22, 24 and splits into two partial flows, one of which flows radially outward between the two hub parts 80 and 84 (through the axial bearing 94) and the other partial flow flows radially outward between the end area of the transmission input shaft 22 remote of the transmission and the hub part 80 and between this hub part 80 and the annular portion 38 of the clutch hub 34 (through the bearings 98 and 100).

Since the cooling oil flowing radially outward could collect in the neighborhood of a radial outward portion of the actuation piston 110 associated with the first multi-disk clutch arrangement 64 and could hinder the engaging movement of the piston 110 due to centrifugal force at least at higher rotational speeds, this piston 110 has at least one pressure compensation opening 162 which enables the cooling oil to flow from one side of the piston to the other. Consequently, collection of the cooling oil can come about on both sides of the piston with corresponding compensation of pressure forces exerted on the piston as a result of centrifugal force. Further, other forces based on an interaction between the cooling oil and the piston are prevented from hindering the required axial piston movements, for example, hydrodynamic forces or the like as well as the piston attaching itself by suction to the outer disk carrier 62.

It is also possible to provide at least one cooling oil flow-off opening in the radially extending, radial outer area of the outer disk carrier 62 of the first multi-disk clutch arrangement 64. A cooling oil flow-off opening of this kind is indicated by dashed lines at 164. In order nevertheless to ensure a sufficient flow of cooling oil through the disk stack 76 of the first multi-disk clutch arrangement 64, a cooling oil conducting element (generally a cooling fluid conducting element) may be provided. It is indicated in dashed lines in FIG. 13 that an adjoining end disk 166 of the disk stack 76 could have a cooling oil conducting portion 168, so that the end disk 166 itself serves as cooling oil conducting element.

For the purpose of a simple construction of the pressure control device for actuation of the two multi-disk clutch arrangements 64, 72, provision was made in the embodiment of FIG. 13 to at least partially compensate for a torque transmission capability which is given per se for the radial inner multi-disk clutch arrangement 72 with respect to an actuation pressure and which is smaller (because of a smaller effective friction radius than the radial outer clutch arrangement 64) compared to the other clutch arrangement 64. Thus, the pressure application surface of the piston 130 associated with the pressure chamber 140 is greater than the pressure application surface of the piston 110 associated with the pressure chamber 118, so that the axially directed forces acting on piston 130 are greater than those exerted on piston 110 at the same hydraulic oil pressure in the pressure chambers.

Advantageously, good use of the available installation space may be made by means of a radial offsetting of the seals associated with the piston, especially also an axial overlapping of at least some of the seals.

Steps for preventing the risk of overheating can be taken with the disk stacks 74, 76 in addition to the supply of cooling oil already described and the forming of cooling oil passages (only shown schematically in FIG. 13) in the disk carriers. Accordingly, it is advantageous to use at least some of the disks as "heat buffers" which temporarily store heat which occurs, for example, during slip operation and which momentarily overburdens the possibilities for heat flow-off by means of the cooling fluid (in this case cooling oil) or by means of heat conduction via the disk carriers, so that the heat can be guided off subsequently, for example, in a disengaged state of the respective multi-disk clutch arrangement. For this purpose, disks without friction linings in the radial inner (second) multi-disk clutch arrangement 72 are constructed so as to be thicker axially than friction lining carrying elements of disks carrying friction linings in order to provide a comparatively large material volume with corresponding heat capacity for the disks without friction linings. These disks should be produced from a material having a considerable heat storage capability (heat capacity), for example, steel. When using conventional friction linings made of paper, for example, the friction lining carrying disks can only store a little heat intermediately, since paper has a poor thermal conductivity.

The heat capacity of the friction lining carrying elements carrying the friction linings can likewise be made available as a heat accumulator when lining materials with high conductivity are used instead of lining materials with low conductivity. The use of friction linings of sintered material having a comparatively high heat conductivity is possible. However, the use of sintered linings is problematic in that sintered linings have a degressive curve of the friction coefficient over a slippage speed (relative rotational speed $\Delta N$ between the rubbing surfaces), that is, in that $d\mu/d\Delta N<O$. A degressive curve of the friction coefficient is disadvantageous insofar as this can promote a self-excitation of vibrations in the drivetrain or at least can not dampen vibrations. Therefore, it is advantageous when disks with friction linings of sintered material as well as disks with friction linings of another material with a progressive friction coefficient curve over the slippage speed $d\mu/d\Delta N>O$ are provided in a disk stack 74, 76, so that a progressive friction coefficient curve over the slippage speed or at least approximately a neutral friction coefficient curve over the slippage speed $d\mu/d\Delta N=O$ results on the whole for the disk stack and consequently a self-excitation of vibrations in the drivetrain is at least not promoted or—preferably—rotational vibrations in the drivetrain are even damped (because of a considerable progressive friction coefficient curve over the slippage speed).

In the embodiment of FIG. 13, the disk stack 74 of the radial inner multi-disk clutch arrangement 72 is constructed without sintered linings since the radial outer multi-disk clutch arrangement 64 is preferably used as starting clutch with corresponding slippage operation. The latter, that is the use of the radial outer multi-disk clutch arrangement 64 as a starting clutch, is advantageous insofar as this multi-disk clutch arrangement can be operated with smaller actuation forces (for the same torque transmission capability) because of the greater effective friction radius, so that surface pressing can be reduced compared to the second multi-disk clutch arrangement 72. It is also helpful in this respect when the disks of the first multi-disk clutch arrangement 64 are formed with a somewhat greater radial height than the disks of the second multi-disk clutch arrangement 72. If desired, however, friction linings of sintered material can also be used for the disk stack 74 of the radial inner (second) multi-disk clutch arrangement 72, preferably—as previously stated—in combination with friction linings from another material such as paper.

While all inner disks carry a friction lining and all outer disks are disks without linings in the disk stack 74 of the radial inner multi-disk clutch arrangement 72, wherein the end disks defining the disk stack axially are outer disks and are accordingly disks without lining, the inner disks in the disk stack 76 of the first multi-disk clutch arrangement 64 are disks without linings and the outer disks, including the end disks 166, 170, are disks carrying friction linings.

Preferably, at least the end disks 166 and 170 have lining carrying elements which are substantially thicker axially than the lining carrying elements of the other outer disks and are constructed with linings of sintered material in order to make the lining-carrying elements of the two end disks having a comparatively large volume usable as heat buffers. As in the disk stack 74, the disks without linings are axially thicker than the friction lining carrying elements of the disks carrying friction linings (with the exception of the end disks) in order to provide a comparatively large heat capacity for temporary storage of heat. The outer disks located on the axial inner side should have, at least in part, friction linings of another material exhibiting a progressive friction coefficient curve in order to achieve at least an approximately neutral friction coefficient curve over the slippage rotation speed for the disk stack in its entirety.

The person skilled in the art can easily gather further details of the dual clutch 12 according to the described embodiment example from FIG. 13. Accordingly, the axial bore hole in the annular portion 36 of the clutch hub 34 in which the internal toothing 46 for the pump drive shaft is formed is closed in an oil-tight manner by a stopper 180 which is held therein. The carrier plate 60 is fixed axially at the outer disk carrier 62 by two retaining rings 172, 174, the retaining ring 172 also supports the end disk 170 axially. A corresponding retaining ring is also provided for supporting the disk stack 74 at the outer disk carrier 70.

FIG. 14 shows a rotor device 700 which can be used as component P 220 in the embodiment of FIG. 1 or as component P 220a of the embodiment of FIG. 9. In the embodiment of FIG. 1, the rotor device has at least one pressure medium connection 702 connected to the pump 208 via the valve 218 or directly to a cooling oil connection 703 which is connected to the reservoir 222 and from which cooling oil can flow, possibly via a check valve, not shown, into a housing 706 of the rotor device 700 constructed in multiple parts to two conveying rotors 708a and 708b which have conveying structures in the form of toothings meshing with one another. The two conveying rotors 708a and 708b form an external toothed gear pump.

Pressure oil flowing into the housing 706 via the connection 702 strikes two drive rotors 710a and 710b which have meshing drive geometries in the form of toothings and are set in rotation by the pressure oil. The two drive rotors 710a and 710b form a hydromotor 710 in a rotary positive-displacement type construction, especially an external toothed gear motor. The drive rotor 710a is connected with the conveying rotor 708a so as to be fixed with respect to rotation relative to it and the drive rotor 710b is connected with the conveying rotor 708b so as to be fixed with respect to rotation relative to it. In FIG. 16, cooling oil conveyed by the conveying rotors 708a and 708b flows over a flow-off channel 716 in the direction of the dual clutch 202 in order to supply the disk clutches 204 and 206 with cooling oil. The pressure oil which has passed the drive rotors 710a and 710b flows off via a channel 717 which preferably passes into the channel 716.

Figure 17:
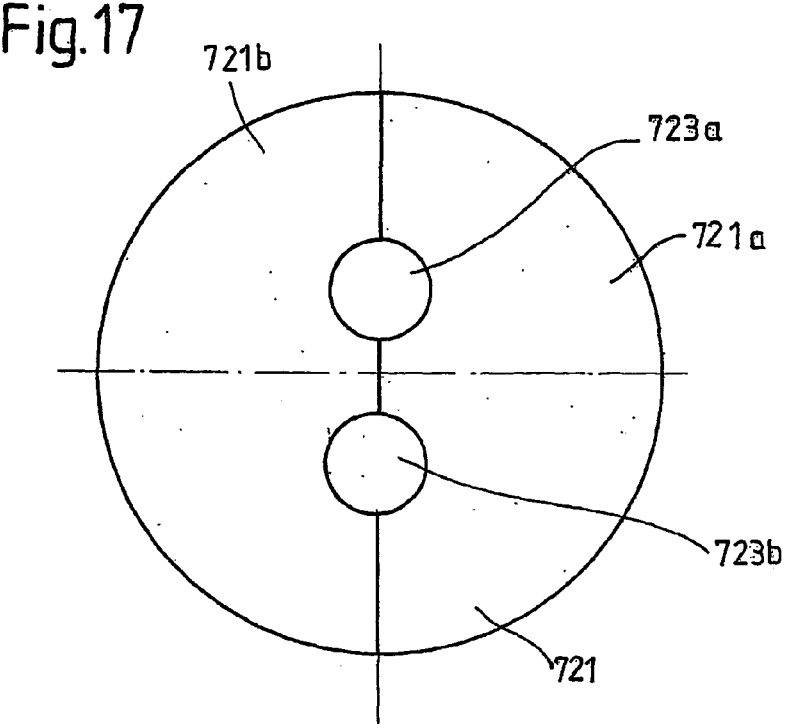
FIG. 17 is an aerial plan view showing divided sealing disk of the rotor device.

As is shown in FIG. 14, the drive rotor 710a and the conveying rotor 708a have a common rotating shaft, e.g., such that two toothed gears are cut into a rotating shaft. The same can apply to the drive rotor 710b and the conveying rotor 708b as is shown in FIG. 14. As was mentioned, the pair of rotors (possibly a pair of toothed gears) 710a, 710b are driven by the pump 208, preferably a hydrostatic pump. Since the rotor pair (possibly a toothed gear pair) 708a, 708b is located on the same shaft with a respective drive rotor and, as can be seen in FIG. 14, is longer axially (has teeth which are wider axially) than the drive rotors, a larger volume flow can be conveyed at a lower pressure. According to FIG. 14, the two pairs of rotors and therefore the volume flows (pressure oil volume flow and cooling oil volume flow) are separated from one another by a divided separating or sealing disk 721. The sealing disk is shown in FIG. 17 and comprises two half disks 721a and 721b which define two openings 723a and 723b for the rotor shafts 725a and 725b in the assembled state.

Figure 18:
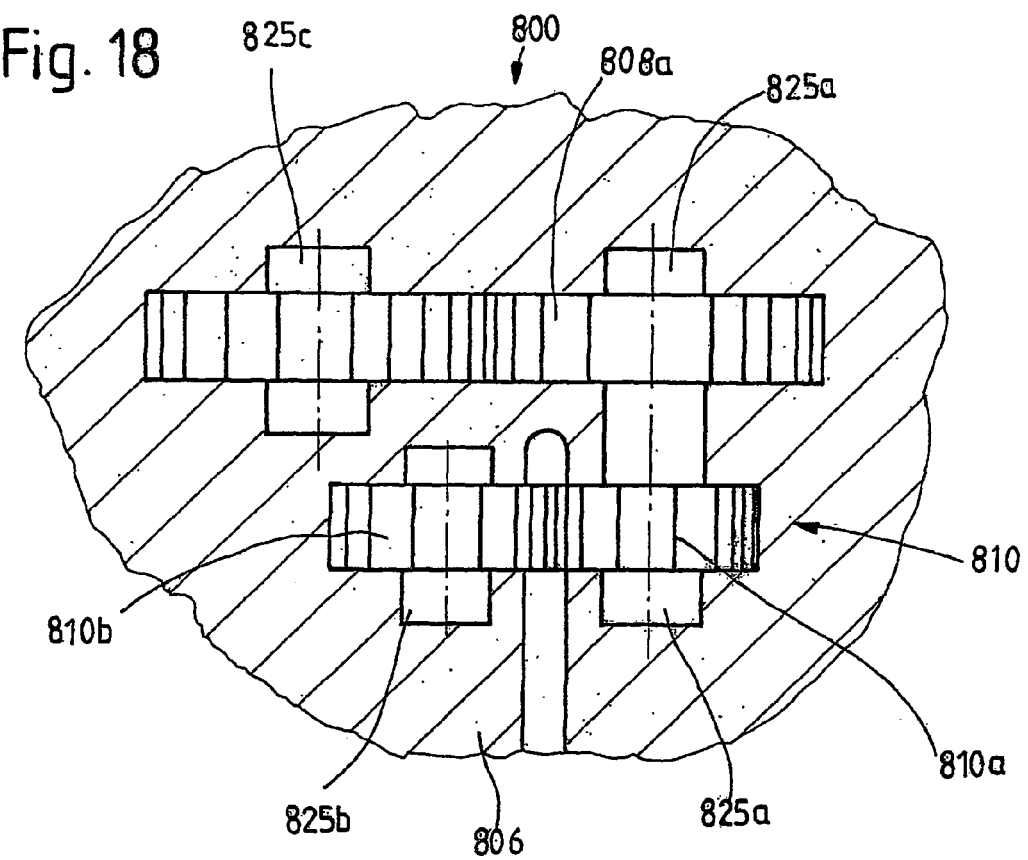
FIG. 18 is a schematic partial cross-sectional view of one embodiment of the rotor device of FIG. 14.

Another embodiment form of a rotor device 800 functioning according to the same principle is shown schematically in FIG. 18. Therein, the drive rotors 810a and 810b of the hydromotor 810 have a smaller diameter than the conveying rotors 808a and 808b, so that a volume flow which is greater than a pressure oil flow driving the drive rotors 810a and 810b can be conveyed again by means of the conveying rotors but, on the other hand, has a lower pressure than this flow of pressure oil. The drive rotor 810a and the conveying rotor 808a have a common rotating shaft 825a. The drive rotor 810b and the conveying rotor 808b have their own rotating shaft 825b and 825c, respectively. These two rotors 810b and 808b are in a drive connection, via their toothings meshing with the toothings of the rotors 810a and 808a, with these rotors, that is, rotors 810a and 808a.

In summary, the invention is directed to a clutch system comprising at least one clutch device particularly for arrangement in a drivetrain between a drive unit and a transmission. The clutch device can be actuated through the intermediary of pressure medium and/or provided for operation under the influence of an operating medium. According to one aspect of the invention, it is suggested that a secondary medium serving as pressure medium for actuation or serving as operating medium for the operation of the clutch arrangement can be supplied by means of a pump arrangement supplying a primary medium and by means of a secondary medium supply arrangement or secondary pump arrangement connected to the pump arrangement, wherein the secondary medium supply arrangement or secondary pump arrangement has at least one pressure receiving element which is arranged so as to be movable in a housing and which is exposed at least on at least one pressure receiving surface in operation with the primary medium supplied by the first pump arrangement, which pressure receiving element is set in motion through the intermediary of the operating medium, and at least one interacting element which is arranged in the/a housing so as to be movable, is coupled with respect to movement with the pressure receiving element and interacts in operation with the secondary medium at least on at least one interaction surface, the secondary medium can be supplied by means of this interaction element possibly through displacement and/or imparting an acceleration and/or imparting angular momentum or swirl.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A clutch system for arrangement in a drivetrain having a drive unit and a transmission, the clutch system comprising:
   a clutch arrangement between the drive unit and the transmission;
   a pump arrangement which supplies pressure medium to the clutch arrangement at a pressure and rate of flow;
   an operating medium supply arrangement which supplies an operating medium to the clutch arrangement at a pressure which is less than the pressure of the pressure medium and a rate of flow which is greater than the rate of flow of the pressure medium, the operating medium supply arrangement comprising
   a pressure receiving element which is movable in a housing and has at least one pressure receiving surface which is exposed to the pressure medium, and
   an interaction element which is coupled to move with the pressure receiving element and has at least one interaction surface which interacts with said operating medium to produce a flow of said operating medium.

2. The clutch system of claim 1 further comprising an operating medium reservoir, said operating medium supply arrangement drawing operating medium from the operating medium reservoir.

3. The clutch system of claim 1 wherein the operating medium supply arrangement comprises a pressure converter.

4. The clutch system of claim 1 wherein the pressure receiving surface is smaller than the interaction surface.

5. The clutch system of claim 1 wherein at least part of said pressure receiving element is constructed as a one piece component with at least part of said interaction element.

6. The clutch system of claim 5 wherein said component comprises a piston having axially opposed end faces which form said pressure receiving surface and said interaction surface.

7. The clutch system of claim 1 wherein at least one of said pressure receiving element and said interaction element comprises a rotor.

8. The clutch system of claim 1 wherein the operating medium supply arrangement pumps the operating medium.

9. The clutch system of claim 1 wherein the clutch arrangement is actuated by the pressure medium.

10. A clutch system for arrangement in a drivetrain having a drive unit and a transmission, the clutch system comprising:
    a clutch arrangement between the drive unit and the transmission;
    a pump arrangement which supplies operating medium to the clutch arrangement at a pressure and rate of flow;
    a pressure medium supply arrangement which supplies a pressure medium to the clutch arrangement for actuating the clutch, the pressure medium being supplied at a pressure which is greater than the pressure of the operating medium and a rate of flow which is less than the rate of flow of the operating medium, the pressure medium supply arrangement comprising
    a pressure receiving element which is movable in a housing and has at least one pressure receiving surface which is exposed to the operating medium, and
    an interaction element which is coupled to move with the pressure receiving element and has at least one interaction surface which interacts with said pressure medium to produce a flow of said pressure medium.

11. The clutch system of claim 10 further comprising a pressure medium reservoir, said pressure medium supply arrangement at least one of drawing pressure medium from the reservoir and returning pressure medium.

12. The clutch system of claim 10 wherein the pressure medium supply arrangement comprises a pressure converter.

13. The clutch system of claim 10 wherein the pressure receiving surface is larger than the interaction surface.

14. The clutch system of claim 10 wherein at least part of said pressure receiving element is constructed as a one piece component with at least part of said interaction element.

15. The clutch system of claim 14 wherein said component comprises a piston having axially opposed end faces which form said pressure receiving surface and said interaction surface.

16. The clutch system of claim 10 wherein at least one of said pressure receiving element and said interaction element comprises a rotor.

17. The clutch system of claim 10 wherein the operating medium supply arrangement pumps the operating medium.

18. The clutch system of claim 10 wherein the clutch arrangement is cooled by the operating medium.

19. The clutch system of claim 10 wherein the pressure medium and the operating medium consist of a common hydraulic medium.

20. A clutch system for arrangement in a drivetrain having a drive unit and a transmission, the clutch system comprising:
a clutch device comprising at least one clutch arrangement between the drive unit and the transmission;
a primary pump arrangement which supplies a primary medium to the clutch arrangement, the primary medium consisting of one of an operating medium and a pressure medium; and
a secondary pump arrangement comprising at least one pump element which is movable in a housing and can be driven by the primary medium supplied by the primary pump arrangement to convey a secondary medium to the clutch arrangement, the secondary medium consisting of the other of said operating medium and said pressure medium.

21. The clutch system of claim 20 wherein the primary pump arrangement supplies pressure medium to the clutch arrangement, the at least one pump element of the secondary pump arrangement being driven by the pressure medium supplied by the primary pump arrangement to convey operating medium to the clutch arrangement.

22. The clutch system of claim 21 further comprising an operating medium reservoir, said secondary pump arrangement drawing operating medium from the operating medium reservoir.

23. The clutch system of claim 21 wherein the clutch device is self priming with respect to operating medium, the secondary pump arrangement allowing operating medium to be drawn into the clutch device when the secondary pump arrangement is not operating.

24. The clutch arrangement of claim 21 wherein the clutch device is actuated by the pressure medium.

25. The clutch arrangement of claim 24 wherein the primary pump arrangement supplies the pressure medium at a pressure sufficient to actuate the clutch arrangement.

26. The clutch arrangement of claim 21 wherein the clutch arrangement is a wet clutch arrangement operated under the influence of the operating medium.

27. The clutch system of claim 26 wherein the operating medium is a cooling medium.

28. The clutch system of claim 20 wherein the operating medium is supplied to the clutch arrangement at a pressure and rate of flow, the pressure medium being supplied at a pressure which is greater than the pressure of the operating medium and a rate of flow which is less than the rate of flow of the operating medium.

29. The clutch system of claim 20 wherein the primary pump arrangement is driven by one of an electric motor, the drive unit, and the transmission.

30. The clutch system of claim 20 wherein at least one of said pump arrangements comprises one of a hydrostatic pump and a positive displacement pump.

31. The clutch system of claim 30 wherein the secondary pump arrangement comprises one of a hydrostatic pump and a positive displacement pump.

32. The clutch system of claim 20 wherein at least one of said pump arrangements comprises one of a hydrodynamic pump and a turbine pump.

33. The clutch system of claim 32 wherein the primary pump arrangement comprises one of a hydrodynamic pump and a turbine pump.

34. The clutch system of claim 20 wherein the primary pump arrangement comprises a pump element that can be driven in one of a translational and a rotational manner by an electric motor.

35. The clutch system of claim 20 wherein the pump element of the secondary pump arrangement comprises a piston.

36. The clutch system of 35 wherein the piston is displaceable along an axis and has a first piston surface exposed to the primary medium and a second piston surface interacting with the secondary medium.

37. The clutch system of claim 35 wherein the piston surface exposed to the pressure medium is smaller than the piston surface exposed to the operating medium.

38. The clutch system of claim 35 wherein the secondary pump arrangement comprises a plurality of pistons arranged to operate synchronously with offset piston stroke phases.

39. The clutch system of claim 38 wherein the secondary pump arrangement comprises a pair of pistons arranged to move synchronously in axially opposite directions.

40. The clutch system of claim 35 further comprising a valve arrangement connected to the primary pump arrangement and arranged to trigger a suction stroke and a discharge stroke of the piston.

41. The clutch system of claim 40 further comprising a control input associated with the suction stroke and a control input associated with the discharge stroke, the strokes being triggered by applying pressure of the primary medium to the respective control inputs.

42. The clutch system of claim 41 further comprising a return spring acting on the piston, the spring being compressed during the suction and discharge strokes.

43. The clutch system of claim 41 further comprising a pressure reduction valve which reduces the pressure of the primary medium applied to the control inputs by allowing primary medium to flow off in order to trigger one of the strokes.

44. The clutch system of claim 43 wherein the pressure reduction valve is integrated in the secondary pump arrangement.

45. The clutch system of claim 44 wherein the pressure reduction valve is actuated by one of movement of the piston and the primary medium acting on the pressure reduction valve.

46. The clutch system of claim 45 wherein the pressure reduction valve comprises a plurality of valve elements which are displaceable between an open position and a closed position in response to one of movement of the piston and the primary medium acting on at least one of the valve elements.

47. The clutch system of claim 46 wherein the valve elements comprise a first valve element and a second valve element, the system further comprising a spring arrangement urging the valve elements toward the open position.

48. The clutch system of claim 47 wherein the piston forms the first valve element.

49. The clutch system of claim 48 further comprising a stop, the second valve element moving with the piston and contacting the stop in order to move the second valve element to the open position.

50. The clutch system of claim 20 wherein the secondary pump arrangement comprises at least one non-return valve which prevents backflow of secondary medium from at least one of said clutch arrangement and said secondary pump arrangement.

51. The clutch system of claim 20 wherein the secondary pump arrangement comprises one of a swirl conveying pump, a centrifugal pump, and a rotary positive displacement pump.

52. The clutch system of claim 51 wherein said one of a swirl conveying pump, a centrifugal pump, and a rotary positive displacement pump comprises a rotor which interacts with the secondary medium.

53. The clutch system of claim 52 wherein the primary pump arrangement comprises a hydromotor which drives the rotor.

54. The clutch system of claim 53 wherein the hydromotor is one of a turbine pump and a rotary positive displacement pump.

55. The clutch system of claim 54 wherein the hydromotor is a rotary positive displacement motor which is one of a toothed gear pump and a toothed ring pump.

56. The clutch system of claim 53 wherein the hydromotor comprises a rotor which interacts with the primary medium and is coupled to move with the rotor which interacts with the secondary medium.

57. The clutch system of claim 56 wherein at least one of said rotors comprises at least one of a disk and a shaft provided with blades.

58. The clutch system of claim 56 wherein the rotor of the hydromotor receives the primary medium in a radial-tangential direction and conveys the primary medium in a radial-tangential direction.

59. The clutch system of claim 58 further comprising a housing having flow-in channels and flow-out channels which surround the rotor of the hydromotor radially.

60. The clutch system of claim 56 wherein the rotor of the hydromotor and the rotor interacting with the secondary medium are coaxial.

61. The clutch system of claim 60 wherein the rotor interacting with the secondary medium generates an annular flow of said secondary medium, said annular flow surrounding said primary medium and moving substantially axially.

62. The clutch system of claim 61 wherein the primary medium and the secondary medium merge into a common flow.

63. The clutch system of claim 53 wherein at least one of said hydromotor and said secondary pump arrangement has at least two rotors which are not coaxial to each other.

64. The clutch system of claim 63 wherein the hydromotor has a first rotor having teeth and a second rotor having teeth, said teeth of said first and second rotors meshing to convey said primary medium.

65. The clutch system of claim 64 wherein the secondary pump arrangement has a first rotor having teeth and a second rotor having teeth, said teeth of said first and second rotors meshing to convey said secondary medium.

66. The clutch system of claim 65 wherein the first rotor of the hydromotor and the first rotor of the secondary pump arrangement are on a common shaft, and the second rotor of the hydromotor and the second rotor of the secondary pump arrangement are on a common shaft.

67. The clutch system of claim 51 wherein the secondary pump arrangement comprises one of a swirl conveying pump and a centrifugal pump having a rotor which conveys the secondary medium in one of an axial and radial-tangential direction.

68. The clutch system of claim 20 wherein the clutch arrangement is a multidisk clutch arrangement.

69. The clutch system of claim 20 wherein the pressure medium is a hydraulic oil which also serves as a cooling medium.

70. The clutch system of claim 20 wherein the clutch device is a multiple clutch device comprising a plurality of clutch arrangements.

71. The clutch system of claim 20 further comprising an operating medium storage which can be connected to one of the primary and secondary pump arrangements.

72. The clutch arrangement of claim 20 further comprising a pressure medium storage which can be connected to one of the primary and secondary pump arrangements.

* * * * *